(12) United States Patent
Malloy et al.

(10) Patent No.: US 7,181,450 B2
(45) Date of Patent: Feb. 20, 2007

(54) METHOD, SYSTEM, AND PROGRAM FOR USE OF METADATA TO CREATE MULTIDIMENSIONAL CUBES IN A RELATIONAL DATABASE

(75) Inventors: William Earl Malloy, Santa Clara, CA (US); Nathan Gevaerd Colossi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 10/323,131

(22) Filed: Dec. 18, 2002

(65) Prior Publication Data

US 2004/0122844 A1 Jun. 24, 2004

(51) Int. Cl.
*G06F 17/30* (2006.01)
(52) U.S. Cl. .............................. 707/4; 707/5
(58) Field of Classification Search .......... 707/1–104.1
See application file for complete search history.

(56) References Cited

U.S. PATENT DOCUMENTS

| 5,905,985 A |   | 5/1999 | Malloy et al. ............... 707/100 |
| 5,918,232 A | * | 6/1999 | Pouschine et al. ....... 707/103 R |
| 5,926,818 A |   | 7/1999 | Malloy ....................... 707/100 |

(Continued)

FOREIGN PATENT DOCUMENTS

WO    WO-01/09768    2/2001

OTHER PUBLICATIONS

"ScanChunk: an EfficientAlgorithm for Hunting Dense Regions in Data Cube," by B. Zhou. Department of Computer Science and Engineering, Hangzhou, China. Chinese Journal of Computers, vol. 22, No. 6, pp. 620-626, Jun. 1999. Science Press (Abst).

(Continued)

*Primary Examiner*—Dong Wong
*Assistant Examiner*—Linh Black
(74) *Attorney, Agent, or Firm*—Janaki K. Davda; Konrad Raynes & Victor LLP

(57) ABSTRACT

Disclosed is a method, system, and program for query processing. Metadata for a facts metadata object and one or more dimension metadata objects that are associated with the facts metadata object is stored. A view with columns for one or more measures in the facts metadata object and one or more attributes in the one or more dimension metadata objects is constructed. Additional metadata that describes roles of columns in the fact and dimension metadata objects is generated.

Also disclosed is a computer-readable medium for storing data for access by a program. A data structure stored in the computer-readable medium includes data for use by the program. The data includes a cube model metadata object that includes a facts metadata object, one or more dimension metadata objects, and one or more join metadata objects that describe how one or more tables in the facts metadata object and one or more tables in the one or more dimension metadata objects are joined. The data also includes a cube metadata object that represents a subset of the cube model metadata object and comprises a view with columns for one or more measures of one of the facts metadata objects and one or more attributes of one or more of the dimension metadata objects and a document that describes roles of columns in the facts metadata object and the one or more dimension metadata objects.

30 Claims, 31 Drawing Sheets

U.S. PATENT DOCUMENTS

| | | | |
|---|---|---|---|
| 5,943,668 A | 8/1999 | Malloy et al. | 707/3 |
| 5,978,788 A | 11/1999 | Castelli et al. | 707/2 |
| 5,991,754 A | 11/1999 | Raitto et al. | 707/2 |
| 6,003,024 A | 12/1999 | Bair et al. | |
| 6,003,036 A | 12/1999 | Martin | |
| 6,122,636 A | 9/2000 | Malloy et al. | 707/102 |
| 6,205,447 B1 | 3/2001 | Malloy | 707/102 |
| 6,249,791 B1 | 6/2001 | Osborn et al. | 707/200 |
| 6,366,903 B1 | 4/2002 | Agrawal et al. | 707/2 |
| 6,374,234 B1 | 4/2002 | Netz | 707/2 |
| 6,385,604 B1* | 5/2002 | Bakalash et al. | 707/3 |
| 6,408,292 B1 | 6/2002 | Bakalash et al. | 707/2 |
| 6,438,537 B1 | 8/2002 | Netz et al. | 707/3 |
| 6,449,609 B1* | 9/2002 | Witkowski | 707/4 |
| 6,477,536 B1* | 11/2002 | Pasumansky et al. | 707/102 |
| 6,542,895 B1 | 4/2003 | DeKimpe et al. | 707/101 |
| 6,546,381 B1 | 4/2003 | Subramanian et al. | 707/2 |
| 6,546,395 B1 | 4/2003 | DeKimpe et al. | 707/101 |
| 6,574,619 B1 | 6/2003 | Reddy et al. | 707/2 |
| 6,581,068 B1* | 6/2003 | Bensoussan et al. | 707/104.1 |
| 6,604,110 B1* | 8/2003 | Savage et al. | 707/102 |
| 6,609,123 B1* | 8/2003 | Cazemier et al. | 707/4 |
| 6,651,055 B1 | 11/2003 | Kilmer et al. | 707/3 |
| 6,681,223 B1* | 1/2004 | Sundaresan | 707/6 |
| 6,707,454 B1 | 3/2004 | Barg et al. | 345/440 |
| 6,775,662 B1 | 8/2004 | Witkowski et al. | 707/3 |
| 6,871,140 B1* | 3/2005 | Florance et al. | 701/207 |
| 2001/0026276 A1* | 10/2001 | Sakamoto et al. | 345/473 |
| 2001/0037228 A1 | 11/2001 | Ito et al. | 705/7 |
| 2001/0047364 A1 | 11/2001 | Proctor | |
| 2002/0002469 A1* | 1/2002 | Hillstrom | 705/1 |
| 2002/0029207 A1 | 3/2002 | Bakalash et al. | |
| 2002/0078039 A1 | 6/2002 | Cereghini et al. | |
| 2001/0087516 | 7/2002 | Cras et al. | |
| 2002/0087516 A1 | 7/2002 | Cras et al. | 707/2 |
| 2002/0091681 A1 | 7/2002 | Cras et al. | |
| 2002/0095430 A1 | 7/2002 | Egilsson et al. | 707/104.1 |
| 2002/0129003 A1 | 9/2002 | Bakalash et al. | |
| 2002/0129032 A1 | 9/2002 | Bakalash et al. | |
| 2003/0078852 A1* | 4/2003 | Shoen et al. | 705/26 |
| 2004/0059705 A1* | 3/2004 | Wittke et al. | 707/1 |
| 2004/0139061 A1 | 7/2004 | Colossi et al. | |
| 2004/0215626 A1 | 10/2004 | Colossi et al. | |

OTHER PUBLICATIONS

"TOPAZ: a Cost-Based, Rule-Driven, Multi-Phase Parallelizer," by C Nippl and B. Mitschang. Proceedings of the Twenty-Fourth International Conference on Very-Large Databases, pp. 251-262, 1998. San Francisco: Morgan Kaufmann Publishers, Inc.

U.S. Appl. No. 09/356,647, filed on Jul. 19, 1999, entitled "Improvig Performance of Table Insertion by Using Multiple Threads," by DM DeKimpe, WE Malloy, SE Moore and G. Robinson.

ACM Digital Library, 1998. "Simultaneous Optimization and Evaluation of Multiple Dimensional Queries," by Y. Zhao, P.M. Deshpande, J.F. Naughton and A. Shukla. SIGMOD Record, vol. 27, No 2, pp. 271-282, Jun. 1998.

ACM Digital Library, 1998. An Alternative Storage Organization for ROLAP Aggregate Views Based on Cubetrees, by Y. Kotidis and N. Roussopoulos. SIGMOD Record, vol. 27, No. 2, pp. 249-258.

ACM Digital Library, 1998 "Requirement-Based Data Cube Schema Design," by D. Cheung, B. Zhou, B. Kao, H. Lu, T.W. Lam and H.F. Ting. Department of Computer Science and Information Systems, University of Hong Kong, pp. 162-169.

ACM Digital Library, 1999. "High Performance Multidimensional Analysis of Large Datasets," by S. Goil and A. Choudhary. Center for Parallel and Distributed Computing, Department of Electrical and Computer Engineering, Northwestern University, pp. 34-39.

"Towards the Building of a Dense-Region-Based OLAP System," by D.W. Cheung, B. Zhou, B. Kao, K. Hu and S.D. Lee, Department of Computer Science and Information Systems; Hong Kong Univ., China. Data and Knowledge Engineering, vol. 36, No. 1, pp. 1-27, Jan. 2001. (Abst).

Colossi, N., W. Malloy and B. Reinwald. "Relational Extensions for OLAP." IBM Systems Journal, vol. 41, No. 4, 2002, pp. 714-731.

Hyperion Solutions Corp., © 1998. "Providing OLAP to User-Analysts: An IT Mandate," by E.F. Codd & Associates, pp. 1-22. [online] [retrieved on Oct. 8, 2002]. Retrieved from http://www.hyperion.com/downloads/olap_to_useranalysts_wp.pdf.

Business Intelligence, Ltd., © 2002. "The OLAP Report: What is OLAP?," N. Pendse, pp. 1-7, [online] [retrieved on Oct. 8, 2002]. Retrieved from http://www.olapreport.com/fasmi.

Microsoft Corp. & Hyperion Solutions Corp., "XML for Analysis Specification," Version 1.0, Updated on Apr. 24, 2001; pp. 1-107, [online] [retrieved on Oct. 8, 2002]. Retrieved from http://www.essbase,com/downloads/XML_Analysis_spec.pdf.

W3C® (MIT, INRIA, Keio), © 1999. "XML Path Language (Xpath)," Version 1.0, W3C Recommendation Nov. 16, 1999, pp. 1-37, [online] [retrieved on Oct. 8, 2002]. Retrieved from http://www.w3/prg/TR/xpath.

Amendment and Request for Preparation of International Preliminary Examination Report in PCT International Application No. PCT International Application No. PCT/GB2003/005490, filed Mar. 31, 2005.

Gray, J., S. Chaudhuri, A. Layman, D. Reichart, M. Venkatrao, F. Pellow, & H. Pirahesh, "Data Cube: A Relational Aggregation Operator Generalizing Group-By, Cross-Tab, and Sub-Totals", *Journal of Data Mining and Knowledge Discovery*, 1997, 29-53.

Mangisengi, O., A.M. Tjoa, & R.R. Wagner, "Metadata Management Concept for Multidimensional OLAP Data Based on Object-Oriented Concepts", *Proceedings of the First International Conference on Web Information Systems Engineering*, Jun. 2000, pp. 358-365.

PCT International Preliminary Examination Report for International Application No. PCT/GB03/05490, issued Apr. 11, 2005., pp. 1-11.

PCT International Search Report for International Application No. PCT/GB03/05490, issued Apr. 16, 2004.

PCT Written Opinion for International Application No. PCT/GB03/05490, issued Sep. 6, 2004.

Raphaely, D., M. Cyran, J. Gibb, V. Krishnamurthy, M. Krishnaprasad, J. Melnick, R. Smith, & R. Urbano, "Oracle8i Application Developer's Guide- Findamentals", Release 8.1.5, Feb. 1999, pp. 20-1 to 20-22.

Reply to Written Opinion in PCT International Application No. PCT/GB03/05490, filed Nov. 24, 2004, pp. 1-4.

Schwarz, H., R. Wagner, & B. Mitschang, "Improving the Processing of Decision Support Queries: The Case for a DSS Optimizer", *Proceedings of the International Database Engineering and Applications Symposium*, Jul. 2001, pp. 177-186.

Stohr, T., R. Muller, & E. Rahm, "An Integrative and Uniform Model for Metadata Management in Data Warehousing Environments", *Proceedings of the International Workshop on Design and Management of Data Warehouse*, Jun. 1999, pp. 1-16.

Colliat, G., "Olap, Relational, and Multidimensional Database Systems", Sigmod Record, vol. 25, No. 3, Sep. 1996, pp. 64-69.

\* cited by examiner

Cube Model:

1800

| Property | Value |
|---|---|
| Name | LocationProduct |
| Facts | SalesFacts |
| Set of Dimensions | (Location, LocationFacts), (Product, ProductFacts) |

Cube:

1802

| Property | Value |
|---|---|
| Name | LocationProduct |
| Cube Model | LocationProduct |
| Cube Facts | SalesCFacts |
| List of Cube Dimensions | LocationCD, ProductCD |

Facts:

1804

| Property | Value |
|---|---|
| Name | SalesFacts |
| Set of Measures | Revenue, Profit |
| Set of Attributes | ProductID_Facts, LocationID_Facts |
| Set of Joins | <no joins used> |

Cube Facts:

1806

| Property | Value |
|---|---|
| Name | SalesCFacts |
| Facts | SalesFacts |
| Set of Measures | Revenue, Profit |

Measure:

1808

| Property | Value |
|---|---|
| Name | Revenue |
| List of SQL Expression Template | "{$$1}" |
| List of Columns and Measures | *Column*: Facts.SalesDollar |
| List of Aggregations | (SUM, <empty>) |
| Datatype | DOUBLE |

1810

| Property | Value |
|---|---|
| Name | Profit |
| List of SQL Expression Template | "{$$1} - {$$2}" |
| List of Columns and Measures | *Measure*: Revenue, *Column*: Facts.SalesCost |
| List of Aggregations | (SUM, <empty>) |
| Datatype | DOUBLE |

FIG. 18A

Dimension:

1812:

| Property | Value |
|---|---|
| Name | Location |
| Set of Attributes | LocationID, Country, State, City |
| Set of Joins | <no joins used> |
| Set of Hierarchies | LocDetail, LocOverview |
| Type | REGULAR |

1814:

| Property | Value |
|---|---|
| Name | Product |
| Set of Attributes | ProductID, GroupName, ProdName |
| Set of Joins | <no joins used> |
| Set of Hierarchies | Product |
| Type | REGULAR |

Cube Dimension:

1816:

| Property | Value |
|---|---|
| Name | LocationCD |
| Dimension | Location |
| Cube Hierarchy | LocOverviewCH |

1818:

| Property | Value |
|---|---|
| Name | ProductCD |
| Dimension | Product |
| Cube Hierarchy | ProductCH |

Hierarchy:

1820:

| Property | Value |
|---|---|
| Name | Loc Detail |
| List of Attributes | Country, State, City |
| Set of Attribute Relationships | <no attribute relationships used> |
| Type | BALANCED |
| Deployment | STANDARD |

1822:

| Property | Value |
|---|---|
| Name | LocOverview |
| List of Attributes | Country, State |
| Set of Attribute Relationships | <no attribute relationships used> |
| Type | BALANCED |
| Deployment | STANDARD |

| Property | Value |
|---|---|
| Name | Product |
| List of Attributes | GroupName, ProdName |
| Set of Attribute Relationships | <no attribute relationships used> |
| Type | BALANCED |
| Deployment | STANDARD |

Cube Hierarchy:

1826

| Property | Value |
|---|---|
| Name | LocOverviewCH |
| Hierarchy | LocOverview |
| List of Attributes | Country, State |
| Set of Attribute Relationships | <no attribute relationships used> |

1828

| Property | Value |
|---|---|
| Name | ProductCH |
| Dimension | ProductCD |
| Hierarchy | Product |
| List of Attributes | GroupName, ProdName |
| Set of Attribute Relationships | <no attribute relationships used> |

Join:

1830

| Property | Value |
|---|---|
| Name | LocationFacts |
| Join Triplets | (LocationID, LocationID_Facts, =) |
| Type | INNER |

1832

| Property | Value |
|---|---|
| Name | ProductFacts |
| Join Triplets | (ProductID, ProductID_Facts, =) |
| Type | INNER |

FIG. 18C

Attribute:

| | Property | Value |
|---|---|---|
| 1834 | Name | City |
| | List of Columns and Attributes | *Column*: Location.City |
| | SQL Expression Template | "{$$1}" |
| | Datatype | VARCHAR(40) |
| | Role | LEVEL |
| 1836 | Name | State |
| | List of Columns and Attributes | *Column*: Location.State |
| | SQL Expression Template | "{$$1}" |
| | Datatype | VARCHAR(40) |
| | Role | LEVEL |
| 1838 | Name | ProdName |
| | List of Columns and Attributes | *Column*: Product.Name |
| | SQL Expression Template | "{$$1}" |
| | Datatype | VARCHAR(40) |
| | Role | LEVEL |
| 1840 | Name | GroupName |
| | List of Columns and Attributes | *Column*: Product.GroupName |
| | SQL Expression Template | "{$$1}" |
| | Datatype | VARCHAR(40) |
| | Role | LEVEL |
| 1842 | Name | ProductID |
| | List of Columns and Attributes | *Column*: Product.ProductID |
| | SQL Expression Template | "{$$1}" |
| | Datatype | INTEGER |
| | Role | DIMKEY |
| 1844 | Name | ProductID_Facts |
| | List of Columns and Attributes | *Column*: Facts.ProductID |
| | SQL Expression Template | "{$$1}" |
| | Datatype | INTEGER |
| | Role | DIMKEY |

FIG. 18D

| Property | Value |
|---|---|
| Name | LocationID |
| List of Columns and Attributes | *Column*: Location.LocationID |
| SQL Expression Template | "{$$1}" |
| Datatype | INTEGER |
| Role | DIMKEY |

1846

| Property | Value |
|---|---|
| Name | LocationID_Facts |
| List of Columns and Attributes | *Column*: Facts.LocationID |
| SQL Expression Template | "{$$1}" |
| Datatype | INTEGER |
| Role | DIMKEY |

INITIAL QUERY RESULTS

| | | ELECTRO | | MED | | CLOTH | |
|---|---|---|---|---|---|---|---|
| | | AMOUNT | QUANTITY | AMOUNT | QUANTITY | AMOUNT | QUANTITY |
| 1999-01 | USA | 16255 | 1703 | 8311 | 112 | 5062 | 731 |
| | CANADA | 1948 | 223 | 845 | 122 | 122 | 45 |
| 1999-02 | USA | 16902 | 1769 | 6449 | 807 | 5331 | 770 |
| | CANADA | 1954 | 244 | 912 | 131 | 127 | 48 |

— 2010

RESULT AFTER DRILL-UP

| | | AMOUNT | QUANTITY |
|---|---|---|---|
| 1999-01 | USA | 29598 | 3546 |
| | CANADA | 2915 | 390 |
| 1999-02 | USA | 28682 | 3346 |
| | CANADA | 2993 | 423 |

RESULT AFTER PIVOT

| | | 1999-01 | | 1999-02 | |
|---|---|---|---|---|---|
| | | AMOUNT | QUANTITY | AMOUNT | QUANTITY |
| ELECTRO | USA | 16255 | 1703 | 16902 | 1769 |
| | CANADA | 1948 | 223 | 1954 | 244 |
| MED | USA | 8311 | 1112 | 6449 | 807 |
| | CANADA | 845 | 122 | 912 | 131 |
| CLOTH | USA | 5062 | 731 | 5331 | 770 |
| | CANADA | 122 | 45 | 127 | 48 |

— 2020

RESULT AFTER DRILL DOWN

| | | | ELECTRO | | MED | | CLOTH | |
|---|---|---|---|---|---|---|---|---|
| | | | AMOUNT | QUANTITY | AMOUNT | QUANTITY | AMOUNT | QUANTITY |
| 1999-01 | USA | CA | 8546 | 894 | 5962 | 878 | 4395 | 619 |
| | | NY | 7679 | 809 | 2349 | 234 | 667 | 112 |
| | CANADA | ON | 1948 | 223 | 845 | 122 | 122 | 45 |
| 1999-02 | USA | CA | 8695 | 904 | 6449 | 807 | 5331 | 770 |
| | | NY | 8207 | 865 | 5992 | 777 | 4585 | 649 |
| | CANADA | ON | 1954 | 244 | 457 | 30 | 746 | 121 |
| | | | 1954 | 244 | 912 | 131 | 127 | 48 |
| | | | | | 912 | 131 | 127 | 48 |

| | Product Dimension Levels | | | Location Dimension Levels | | | Member Attribute | Time Dimension Levels | | Measures | |
|---|---|---|---|---|---|---|---|---|---|---|---|
| ProdLine | ProdGroup | Products | Country | State | City | Store | Square_Foot | Year | Month | Amount | Quantity |
| - | - | - | - | - | - | - | - | - | - | 52.00 | 10 |
| - | - | - | - | - | - | - | - | 2000 | - | 26.00 | 4 |
| - | - | - | - | - | - | - | - | 2000 | 2 | 14.00 | 2 |
| - | - | - | - | - | - | - | - | 2000 | 1 | 12.00 | 2 |
| - | - | - | - | - | - | - | - | 1999 | - | 26.00 | 6 |
| - | - | - | - | - | - | - | - | 1999 | 2 | 10.00 | 2 |
| - | - | - | - | - | - | - | - | 1999 | 1 | 16.00 | 4 |
| ... | ... | | | | | | | | | | |
| MED | - | - | USA | NY | - | - | - | 2000 | - | 12.00 | 2 |
| MED | - | - | USA | NY | YKT | - | - | 2000 | 1 | 12.00 | 2 |
| MED | - | - | USA | NY | YKT | 300 | 600 | 2000 | - | 12.00 | 2 |
| CLOTH | JEANS | BLUE | USA | NY | YKT | 300 | 600 | 2000 | 1 | 12.00 | 2 |
| CLOTH | JEANS | BLUE | USA | NY | YKT | 300 | 600 | 2000 | 1 | 12.00 | 2 |
| CLOTH | JEANS | BLUE | USA | NY | YKT | - | - | 2000 | 1 | 12.00 | 2 |
| CLOTH | JEANS | BLUE | Canada | ON | - | - | - | 2000 | - | 12.00 | 2 |
| CLOTH | JEANS | BLUE | Canada | ON | TOR | - | - | 2000 | 2 | 12.00 | 2 |
| CLOTH | JEANS | BLUE | Canada | ON | TOR | 400 | 900 | 2000 | - | 14.00 | 2 |
| | | | Canada | ON | TOR | 400 | 900 | 2000 | 2 | 14.00 | 2 |
| | | | Canada | ON | TOR | 400 | 900 | 2000 | - | 14.00 | 2 |
| | | | Canada | ON | TOR | - | - | 2000 | 2 | 14.00 | 2 |

224 record(s) selected

FIG. 27

2710 — Measures

2720 — Dimension 1: Level 1, Level 2, Level 3, ...

2730 — Dimension 2: Level 1, Level 2, ...

METHOD, SYSTEM, AND PROGRAM FOR USE OF METADATA TO CREATE MULTIDIMENSIONAL CUBES IN A RELATIONAL DATABASE

BACKGROUND OF THE INVENTION

1. Field of the Invention

The present invention relates to using metadata to create multidimensional cubes in a relational database.

2. Description of the Related Art

On-line analytical processing (OLAP) has become increasingly popular. Instead of reviewing piles of static reports printed on green-bar paper, an OLAP analyst can explore business results interactively, dynamically adjusting the view of the data and asking questions and getting answers almost immediately. This freedom from static answers to fixed questions on a fixed schedule allows business analysts to operate more effectively and to effect improvements in business operations.

Nigel Pendse introduced the term "FASMI" to characterize OLAP systems. The FASMI characteristics are: Fast, Analysis, Shared, Multidimensional, and Information. For further information, see N. Pendse, "What Is OLAP?" The OLAP Report, http://www.olapreport.com/fasmi.htm.

As for fast, in keeping with the spirit of the "O" in OLAP, such systems need to provide results very quickly usually in just a few seconds, and seldom in more than 20 or 30 seconds. This level of performance is key in allowing analysts to work effectively without distraction.

As for analysis, considering the "A" in OLAP, OLAP systems generally provide rich analytic functions appropriate to a given application, with minimal programming.

As for shared, an OLAP system is usually a shared resource. This means that there is a requirement for OLAP systems to provide appropriate security and integrity features. Ultimately, this can mean providing different access controls on each cell of a database.

As for multidimensional, multidimensionality is the primary requirement for an OLAP system. OLAP products present their data in a multidimensional framework. Dimensions are collections of related identifiers, or attributes (product, market, time, channel, scenario, or customer, for example) of the data values of the system. The identifiers ("The Lord of the Rings—DVD," "San Jose, Calif.," "2002," "Retail Rental," and "John Q. Public," for example) belonging to the collection for a particular dimension generally have some sort of structure, such as hierarchical. Sometimes there is more than one natural structure for these identifiers.

The multidimensional characteristic means that an OLAP system can quickly switch among various orientations of dimensions, as well as among various subsets and structural arrangements of a dimension. Because of the multidimensional nature of OLAP systems, the collections of data that they implement are referred to as cubes. As for information, OLAP systems store and calculate information. Data for OLAP systems often come from one or more operational systems. Analytical models are applied to these data, and the results are either stored in the system or generated at query time. The quantity of information that a particular OLAP system can manage is one characteristic of that system.

Enterprises have been storing multidimensional data, using a star or snowflake schema, in relational databases for many years. Over time, relational database vendors have added optimizations that enhance query performance on these schemas. During the 1990s many special purpose databases were developed that could handle added calculational complexity and that generally performed better than relational engines.

Multidimensional OLAP (MOLAP) refers to the family of OLAP systems in which special-purpose file systems or indexes are used to store cube data. EXPRESS® Web Publisher, ESSBASE®, TM1®, and PILOT® Suite are a few examples of products based on special-purpose storage and indexing technology. Microsoft's OLAP offering also includes a MOLAP engine. These systems are often read-only systems that are loaded with base data periodically, then derived results are calculated, stored, and indexed. Scalability of MOLAP systems is often limited by the size of the batch window within which derived results are calculated and stored. To improve scalability, such systems often have a means for deferring calculation of some derived results until query time.

For relational OLAP (ROLAP), star schemas have been used for many years as a means for representing multidimensional data in a relational database. Many commercial software development companies, such as MicroStrategy, Brio, Business Objects, Metacube, Hyperion, and Metaphor, have developed batch or interactive multidimensional reporting and exploration interfaces for relational star schemas. These systems were all designed and implemented before super aggregate operators were added to the SQL language definition.

In particular, until a few years ago, relational databases allowed the calculation of aggregates at only a single level per query. For example, one SELECT statement with a GROUP BY clause would be used to retrieve a result set at a quarter level (i.e., for a set of quarters), while another SELECT statement with a GROUP BY clause would be used to retrieve a result set at a month level (i.e., for a set of months). This forced relational OLAP systems to run multiple queries against the database in order to calculate cells at varying levels.

To facilitate OLAP-type query creation and provide more advanced optimizations, a DB2® Relational Database Management System (RDBMS), available from International Business Machines, Corporation, implemented three new super aggregate operators that were added to the SQL standard to allow a single query to generate multiple aggregates: ROLLUP, CUBE, and GROUPING SETS. These super aggregate operators are extensions to the GROUP BY clause and specify that aggregates be generated at multiple levels. For example, one SELECT statement may be used to obtain a result set of calculations of aggregates at multiple levels (e.g., both quarter and month).

Note that these super aggregate operators are more than mere shorthand for generating multiple grouping sets. Because multiple grouping sets are requested in a single statement, RDBMS 110 can build an execution plan that generates all the grouping sets in such a way that each input row needed for the calculation is referenced only once. This can result in performance improvements of orders of magnitude, especially when the set of input rows does not fit in the buffer pool (i.e., cache).

Prior art systems are designed to produce multidimensional reports showing results with different levels of granularity by issuing multiple queries. Multiple result sets are obtained for the multiple queries, and the result sets are merged to form a single report. Such systems depend on some sort of description (metadata) of the roles for the tables and columns in a star schema for generating the necessary SQL to retrieve the data to produce the multidimensional reports. The precise metadata varies from product to product.

Multidimensional on-line analytical processing (OLAP) systems (e.g., from Hyperion Cognos, and Microsoft) are designed to return multidimensional result sets naturally, when given sets of members for each edge of a multidimensional cube. The multidimensional OLAP systems are also designed to compute some or all of the results in advance of any query.

Multidimensional analysis has been done using SQL since the introduction of relational databases, but relational OLAP systems have not been able to return multidimensional results sets naturally or compute some or all of the results in advance of a query.

Thus, there is a need in the art for an improved relational OLAP system.

SUMMARY OF THE INVENTION

Provided are a method, system, and program for query processing. Metadata for a facts metadata object and one or more dimension metadata objects that are associated with the facts metadata object is stored. A view with columns for one or more measures in the facts metadata object and one or more attributes in the one or more dimension metadata objects is constructed. Additional metadata that describes roles of columns in the facts and dimension metadata objects is generated.

Also provided is a computer-readable medium for storing data for access by a program. A data structure stored in the computer-readable medium includes data for use by the program. The data includes a cube model metadata object that includes a facts metadata object, one or more dimension metadata objects, and one or more join metadata objects that describe how one or more tables in the facts metadata object and one or more tables in the one or more dimension metadata objects are joined. The data also includes a cube metadata object that represents a subset of the cube model metadata object and comprises a view with columns for one or more measures of one of the facts metadata objects and one or more attributes of one or more of the dimension metadata objects and a document that describes roles of columns in the facts metadata object and the one or more dimension metadata objects.

The described implementations of the invention provide a method, system, and program for creating and describing views in a relational database such that the resulting views behave similarly to multidimensional databases.

BRIEF DESCRIPTION OF THE DRAWINGS

Referring now to the drawings in which like reference numbers represent corresponding parts throughout:

FIGS. 18A–18E illustrate a possible set of metadata object instances and some properties of metadata objects that may be generated for a star schema in accordance with certain implementations of the invention.

FIG. 20 illustrates views of a sample cube that is typical of grid-based on-line analytical processing (OLAP) viewers (query processors) in accordance with certain implementations of the invention.

FIG. 25 illustrates a sales cube in accordance with certain implementations of the invention.

FIG. 27 illustrates a sample format of a cube view in accordance with certain implementations of the invention.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

A. Multidimensional Metadata Introduction

In certain implementations, the invention provides multidimensional metadata objects and techniques for using the multidimensional metadata objects. For ease of reference, the invention will be referred to as an "OLAP multidimensional metadata system" herein, and multidimensional metadata objects will be referred to as "metadata objects."

In certain implementations, the OLAP multidimensional metadata system 100 is implemented in a DB2® Universal Database (UDB) RDBMS, available from International Business Machines, Inc. Although the present specification describes the use of IBM's DB2® UDB RDBMS software, those skilled in the art will recognize that the present invention can use other RDBMS software, such as RDBMS software available from Oracle, Informix, Sybase. Additionally, the present invention can run on computers using various operating systems, such as IBM Z/OS®, IBM AIX®, MICROSOFT WINDOWS® 2000, MICROSOFT WINDOWS® XP, LINUX®, SOLARIS™, and HP-UX®.

Figure 1:
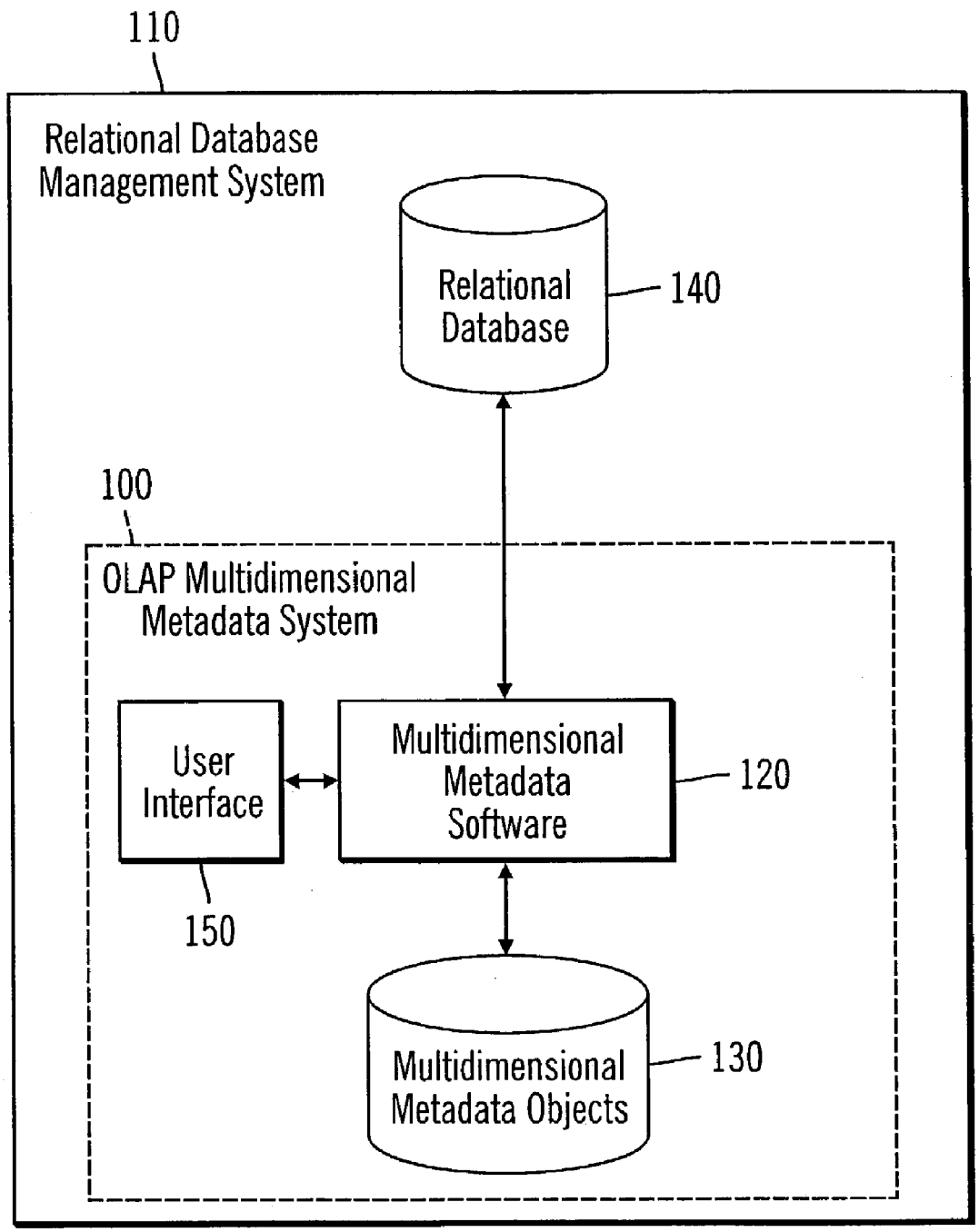
FIG. 1 illustrates, in a block diagram, a computing environment in accordance with certain implementations of the invention.

FIG. 1 illustrates, in a block diagram, a computing environment in accordance with certain implementations of the invention. A Relational Database Management System (RDBMS) 110 includes multidimensional metadata software 120 (e.g., a stored procedure application programming interface (API)) and a user interface 150. The RDBMS 110 accesses multidimensional metadata objects 130 and a relational database 140. In certain implementations, the data in multidimensional metadata objects 130 and relational database 140 may be stored in a single database.

An OLAP multidimensional metadata system 100 includes multidimensional metadata software 120 (e.g., a stored procedure application programming interface (API)), a user interface 150, and multidimensional metadata objects 130. The multidimensional metadata software 120 is used to create, store, and access the multidimensional metadata objects 130. Optionally, a user interface 150 may be provided for a user or administrator to send commands to the multidimensional metadata software 120. A user may create, access, modify, or delete multidimensional metadata objects 130 by submitting commands via the user interface 150. The commands are received and processed by the multidimensional metadata software 120. For example, the multidimensional metadata software 120 may create and store multidimensional metadata objects 130.

In certain implementations, the OLAP multidimensional metadata system 100 provides an add-on feature for an RDBMS 110, such as DB2® Universal Database (referred to herein as DB2® UDB), that improves the ability of the RDBMS 110 to perform OLAP processing. The invention streamlines the deployment and management of OLAP solutions, and improves the performance of OLAP tools and applications.

In particular, the OLAP multidimensional metadata system 100 provides metadata objects. The new metadata objects are stored in, for example, a database catalog (e.g., the DB2® UDB catalog) that describes the dimensional model and OLAP constructs of existing relational data. The database catalog provides a single repository from which OLAP applications can capture multidimensional metadata. In certain implementations, the metadata objects may reside on a data store other than the database catalog or may reside across multiple data stores. With the information in the central repository, a database optimizer is able to use techniques specific to star schemas for optimizing the execution of queries.

With the metadata objects, the invention can optimize OLAP query performance by aggregating data in summary tables and creating indexes. The OLAP multidimensional metadata system 100 also provides a metadata programming interface. In particular, the OLAP multidimensional metadata system 100 provides an SQL and extensible mark-up language (XML)-based application programming interface (API) for OLAP tools and application developers. XML is a text format defined by the World Wide Web Consortium (W3C) and further details on XML may be found at Extensible Markup Language (XML) 1.0 (Second Edition) W3C Recommendation 6 Oct. 2000, which is available at http://www.w3.org/TR/REC-xml. Through CLI, ODBC, or JDBC connections or by using, for example, embedded SQL to DB2® UDB, applications and tools can use a single stored procedure (i.e., an example of multidimensional metadata software 120) to create, modify, and retrieve metadata objects. In certain implementations, multiple stored procedures may provide the functionality for creating, modifying, and retrieving metadata objects.

OLAP multidimensional metadata system 100 metadata objects describe relational information as intelligent OLAP structures, but the multidimensional metadata objects provided by the invention are different from traditional OLAP objects. The metadata objects of the invention store metadata, meaning the metadata objects store information about the data in the base tables. Metadata objects describe where pertinent data is located and can also describe relationships within the base data. For example, a facts metadata object is a specific metadata object that stores information about related measures, attributes and joins, but does not include the data specifically from the base fact table.

Metadata provides a new perspective from which to understand data. Without metadata objects, a database catalog only knows about table and column names and cannot store information about the meanings of the tables and columns or how the tables and columns relate to each other. With metadata objects, this information may be stored.

Each metadata object completes a piece of the big picture showing what the relational data means. Some metadata objects act as a base to directly access relational data by aggregating data or directly corresponding to particular columns in relational tables. Other metadata objects describe relationships between the base metadata objects and link these base metadata objects together. Ultimately, all of the metadata objects can be grouped together by their relationships to each other, into a metadata object called a cube model. A cube model represents a particular grouping and configuration of relational tables. The purpose of a cube model is to describe OLAP structures to a given application or tool. Cube models tend to describe all cubes that different users might want for the data that are being analyzed. A cube model groups dimensions and facts, and offers the flexibility of multiple hierarchies for dimensions. A cube model conveys the structural information needed by query design tools and applications that generate complex queries on star schema databases.

The multidimensional metadata object model is designed to describe the schemas used in relational databases to represent multidimensional data. One way to organize such data is by using a star or snowflake schema (in snowflake schemas the dimension tables are normalized). However, the model is flexible enough to handle any type of schema (e.g., more normalized schemas).

A.1 Multidimensional Metadata Overview

The multidimensional metadata enables maintenance of metadata about OLAP structures stored in data warehouses. This information was not previously available in the database catalog and frequently is not documented by data warehouse metadata repositories. Multidimensional metadata helps the data warehouse designer represent the structural relationship among tables and their columns. Once this metadata exists in the database catalog, other components of the RDBMS 110, such as a database optimizer (e.g., a DB2® UDB optimizer), can take advantage of the structural information and perform queries, against data described by these new OLAP metadata objects, faster. The metadata objects can also assist business intelligence tools by providing the base structural information needed to generate multidimensional queries against the data warehouse. In order to capture OLAP structural information, the OLAP multidimensional metadata system 100 defines several new metadata objects. These metadata objects are able to describe key aspects of schemas frequently used to model OLAP data, such as star-join and snowflake schemas.

Adding the metadata objects to a database catalog provides full functionality and integration with other database components. The new metadata objects are owned by a schema, in the same way as regular tables. Another design point for the metadata objects is that most of them are independently useful. That is, the metadata objects provide information about the underlying relational schema, whether or not the metadata objects are included in a more complex multidimensional structure.

Figure 2:
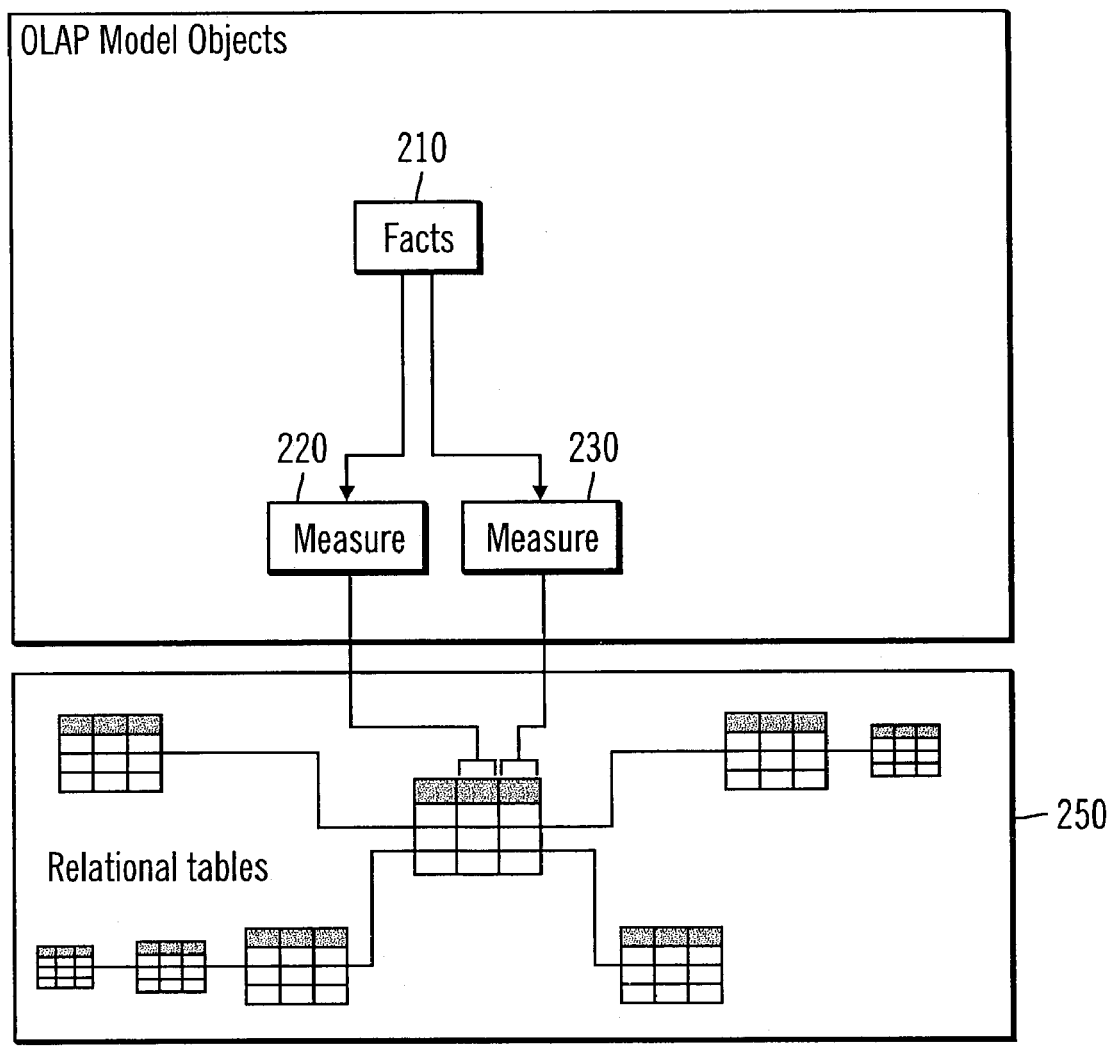
FIG. 2 illustrates that a facts metadata object and measures metadata objects relate to relational data in accordance with certain implementations of the invention.

A cube model can be constructed in many ways, but is often built to represent a relational star schema or snowflake schema. A cube model based on a simple star schema is built around a central facts metadata object that describes aggregated relational data from a fact table. Measure metadata objects describe data calculations from columns in a relational table and are joined together to create the facts metadata object. FIG. 2 illustrates that a facts metadata object 210 and measures metadata objects 220, 230 relate to relational data 250 in accordance with certain implementations of the invention.

Dimension metadata objects are connected to the facts metadata object in a cube model just as the dimension tables are connected to the fact table in a star schema. Columns of data from relational tables are represented by attribute metadata objects that are joined together to make up a dimension metadata object.

Figure 3:
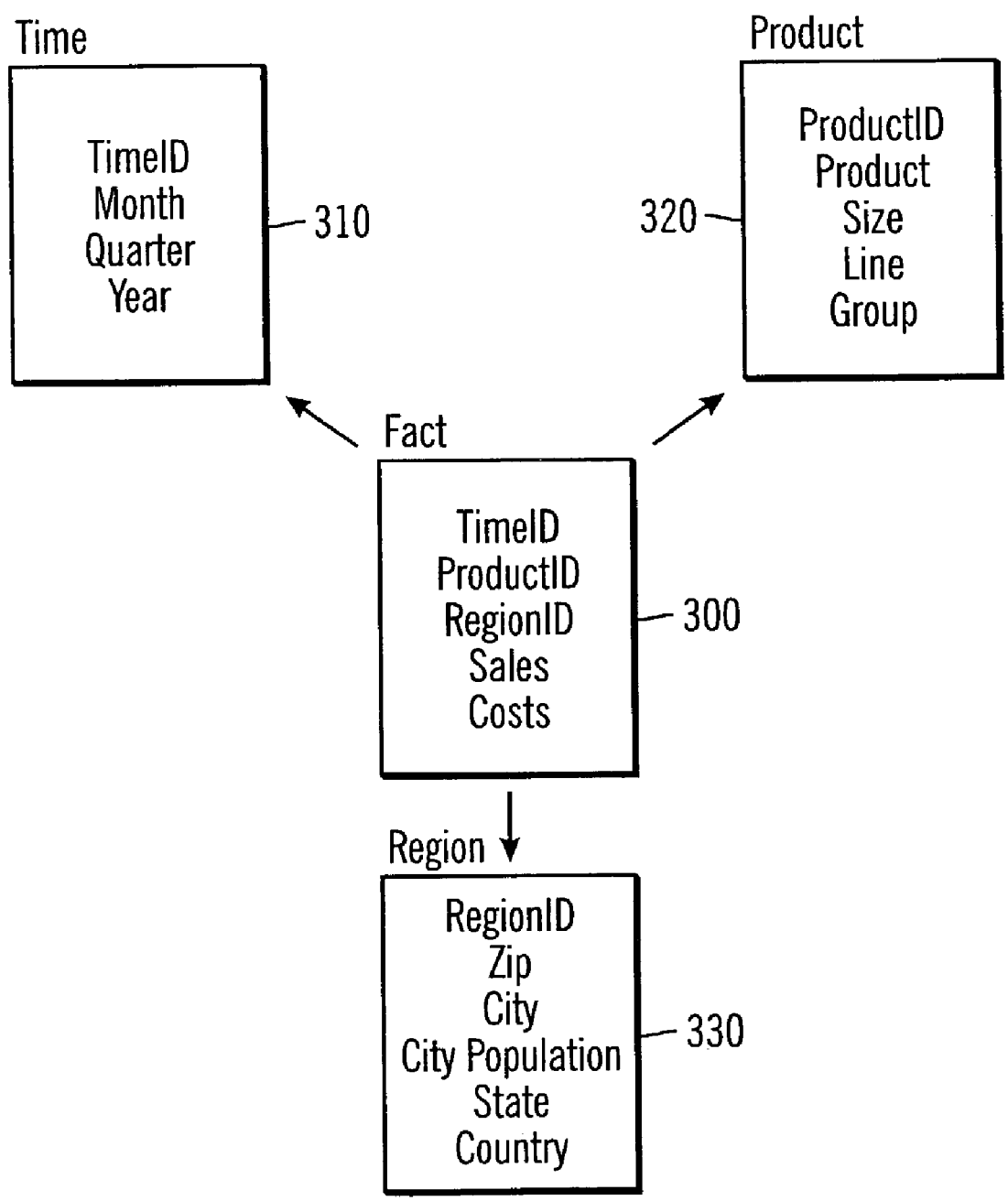
FIG. 3 illustrates a sample star-join schema in accordance with certain implementations of the invention.

FIG. 3 illustrates a sample star-join schema in accordance with certain implementations of the invention. The star-join schema has Time 310, Product 320, and Region 330 dimension tables joined to a central Sales facts table 300. Attributes are created for the relevant dimension and fact table 300, 310, 320, 330 columns in a relational table. Each dimension table 310, 320, 330 has a dimensional key attribute such as TimeID, ProductID, or RegionID. The region dimension table 330 also has City and City_Population attributes and an attribute relationship named CityPop AR. The attribute relationship expresses the functional dependency that every value in the City attribute determines a corresponding value in the City_Population attribute. Within the facts table, there are two measures for Sales and Costs and the three dimensional key attributes TimeID, ProductID, and RegionID.

Three joins join each dimension table 310, 320, 330 to the central facts table 300 on the corresponding dimensional key attributes. In this example, the dimension tables 310, 320, 330 are joined with the facts table 300 based on either the TimeID, ProductID, or RegionID attributes.

Figure 4:
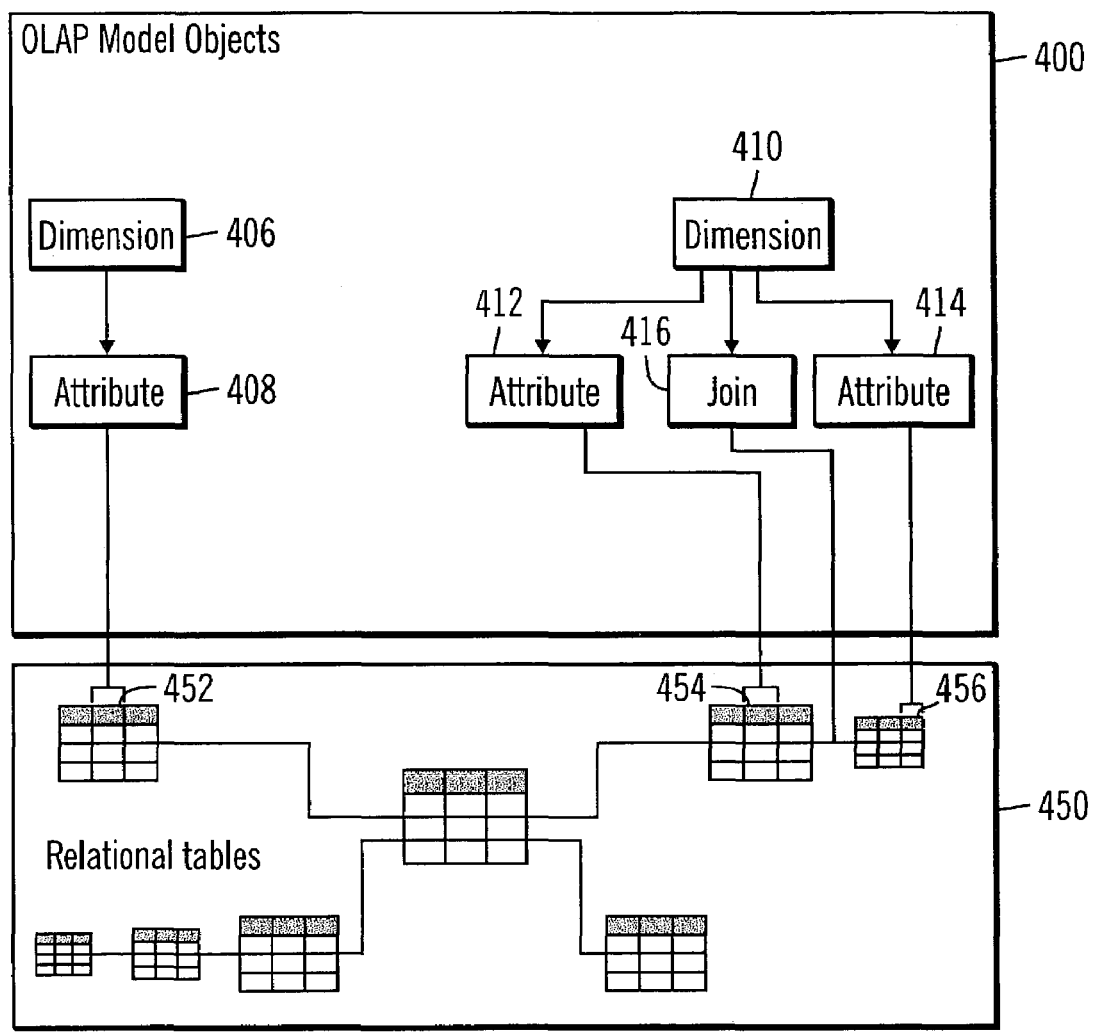
FIG. 4 illustrates that dimension metadata objects are built from relational tables in accordance with certain implementations of the invention.

FIG. 4 illustrates that dimension metadata objects 406, 410 are built from relational tables 450 in accordance with certain implementations of the invention. For example, among the metadata objects x, dimension metadata object 406 is built on attribute metadata object 408, and attribute metadata object 408 is connected to an attribute 452 in a relational table. Dimension metadata object 410 is built on attribute metadata objects 412, 414 and a join metadata object 416. The attribute metadata objects are connected to attributes 454 and 456 in the relational tables 450.

Hierarchies store information about how the attributes within a dimension are related to each other and structured. As a metadata object, a hierarchy provides a way to calculate and navigate a dimension. Each dimension has a corresponding hierarchy with levels defined for each member attribute. For example, the Region dimension has a RegionH hierarchy with levels defined for the State and City attributes, and also references the CityPop AR attribute relationship. In a cube model, each dimension can have multiple hierarchies, but the example star schema has one hierarchy defined for each dimension.

In a star schema, all of the dimension metadata objects are connected in a star shape to a central facts metadata object to create a cube model. Join metadata objects can join tables to create a facts metadata object or a dimension metadata object. Metadata joins can also act as glue within the cube model by joining facts metadata objects to dimension metadata objects. The dimension metadata objects have information about all of their component hierarchies, attributes, attribute relationships and related joins. Facts metadata objects have information about all of their component measures, attributes, and related joins.

Figure 5:
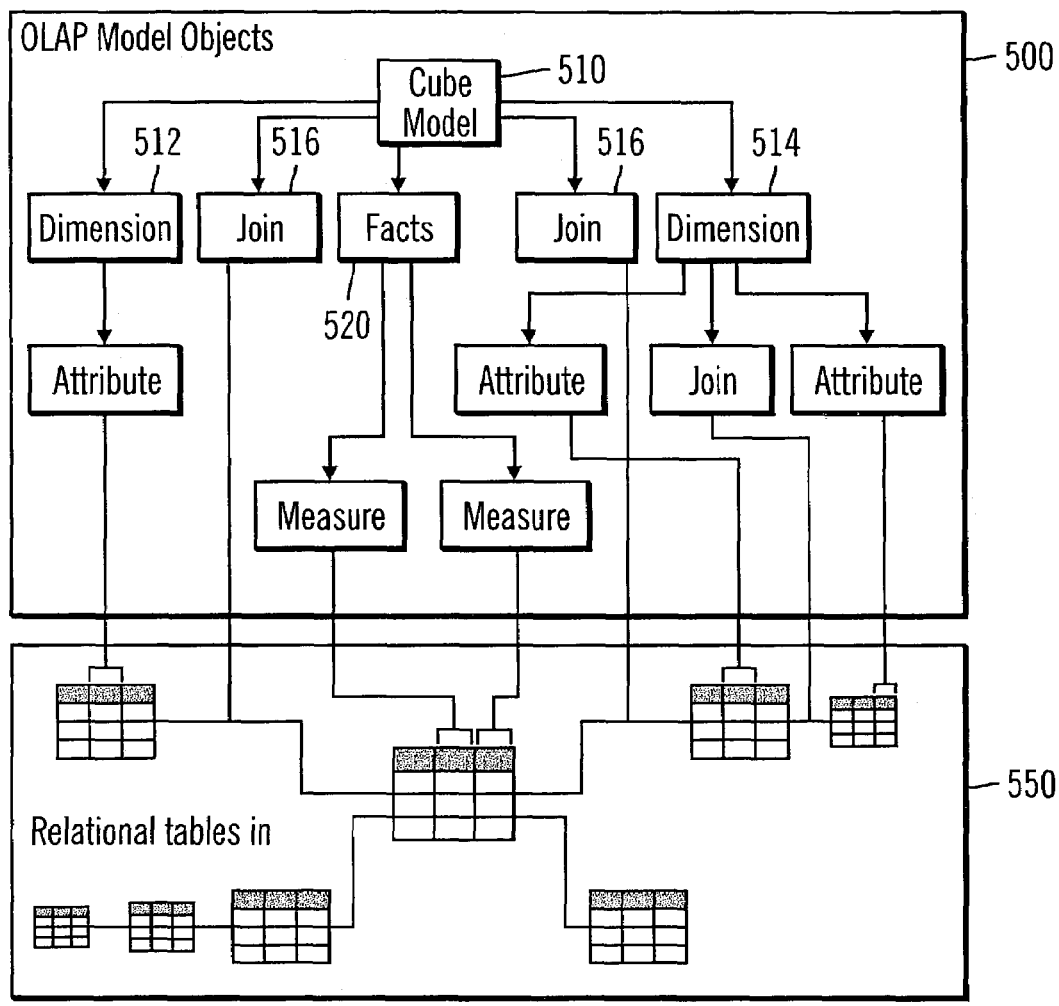
FIG. 5 illustrates that metadata objects fit together in a cube model and map to a relational star schema of relational tables in accordance with certain implementations of the invention.

FIG. 5 illustrates that metadata objects 500 fit together in a cube model and map to a relational star schema of relational tables 550 in accordance with certain implementations of the invention. A cube model metadata object 510 is built on dimension metadata objects 512, 514, join metadata objects 516, 518, and a facts metadata object 520.

Cube model metadata objects are flexible metadata objects whose components may be reused to create more precise cube metadata objects for specific applications. For example, a cube model metadata object may have 37 facts, but one cube metadata object generated from the cube model metadata object may eliminate one or more dimension metadata objects, one or more levels of a dimension metadata object, and/or one or more measures metadata objects.

In addition to cube model metadata objects, there is a more specific metadata object called a cube metadata object. A cube metadata object is the closest metadata object to an OLAP conceptual cube. A cube metadata object is a specific instance or subset of a cube model metadata object. A cube metadata object has a specific set of similar but more restrictive metadata objects derived from the parent cube model metadata object including: cube dimensions, cube hierarchies, and cube facts. For example, a RegionCubeDim is a cube dimension that is a subset of attributes derived from the Region dimension. RegionCubeDim references the State and City attributes, but does not reference the City_Population attribute or CityPop AR attribute relationship. The RegionCubeDim references the Region dimension that it scopes and all of the structural information, including the join information, stays with the cube model Region dimension.

In certain implementations, a cube metadata object has one cube hierarchy defined per cube dimension, while a dimension metadata object can have many hierarchies defined for the cube model metadata object. This structural difference between a cube metadata object and a cube model metadata object allows retrieval of a cube metadata object with a single SQL statement.

Figure 6:
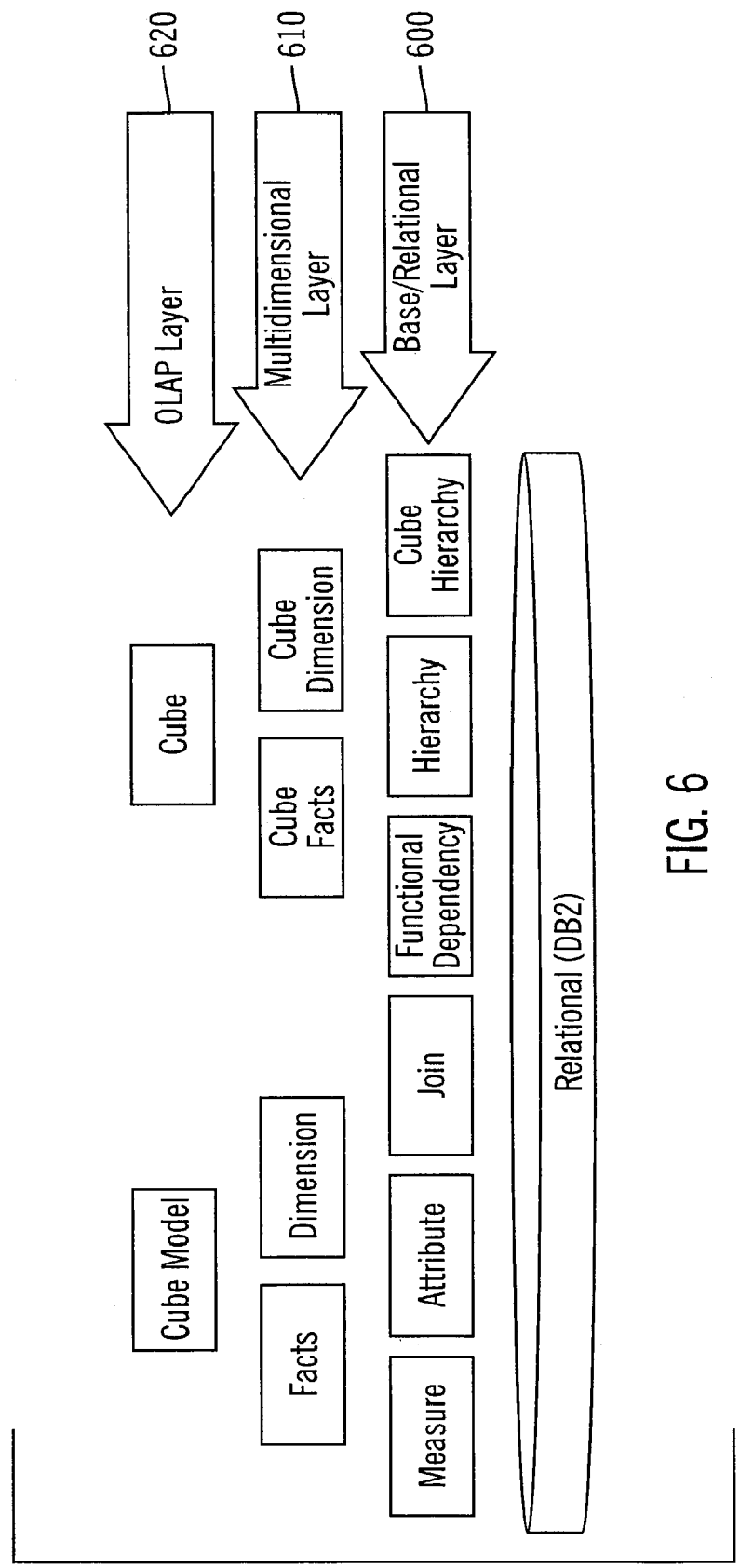
FIG. 6 illustrates that conceptual metadata objects are categorized in three layers in accordance with certain implementations of the invention.

FIG. 6 illustrates that conceptual metadata objects are categorized in three layers in accordance with certain implementations of the invention. These layers are a Base/Relational layer 600, a Multidimensional layer 610, and an OLAP layer 620. The Base/Relational layer 600 provides base infrastructure to other metadata objects and encapsulates concepts of the relational database. The Multidimensional layer 610 includes metadata objects that reference metadata objects in the Base/Relational layer 600 to provide a multidimensional abstraction over the relational database. The OLAP layer 620 contains high-level metadata objects that represent OLAP structures. By grouping metadata objects from other layers, the OLAP layer 620 provides OLAP cubes with different degrees of complexity.

An example is provided for better understanding of the invention. The example is based on a common structure used in data marts, a star-join schema. For the star join schema, instances of the metadata objects are created based on the Base/Relational, Multidimensional, and OLAP layers. FIG. 3 illustrates a simple star-join schema consisting of a fact table 300, Fact, and three dimension tables Time 310, Product 320, and Region 340 in accordance with certain implementations of the invention.

Existing database catalogs typically store table and column names. The information about what roles these tables and columns play, and how the tables and columns relate to each other is lost. However, with the OLAP multidimensional metadata system 100, this information is captured by creating metadata objects.

Figure 7:
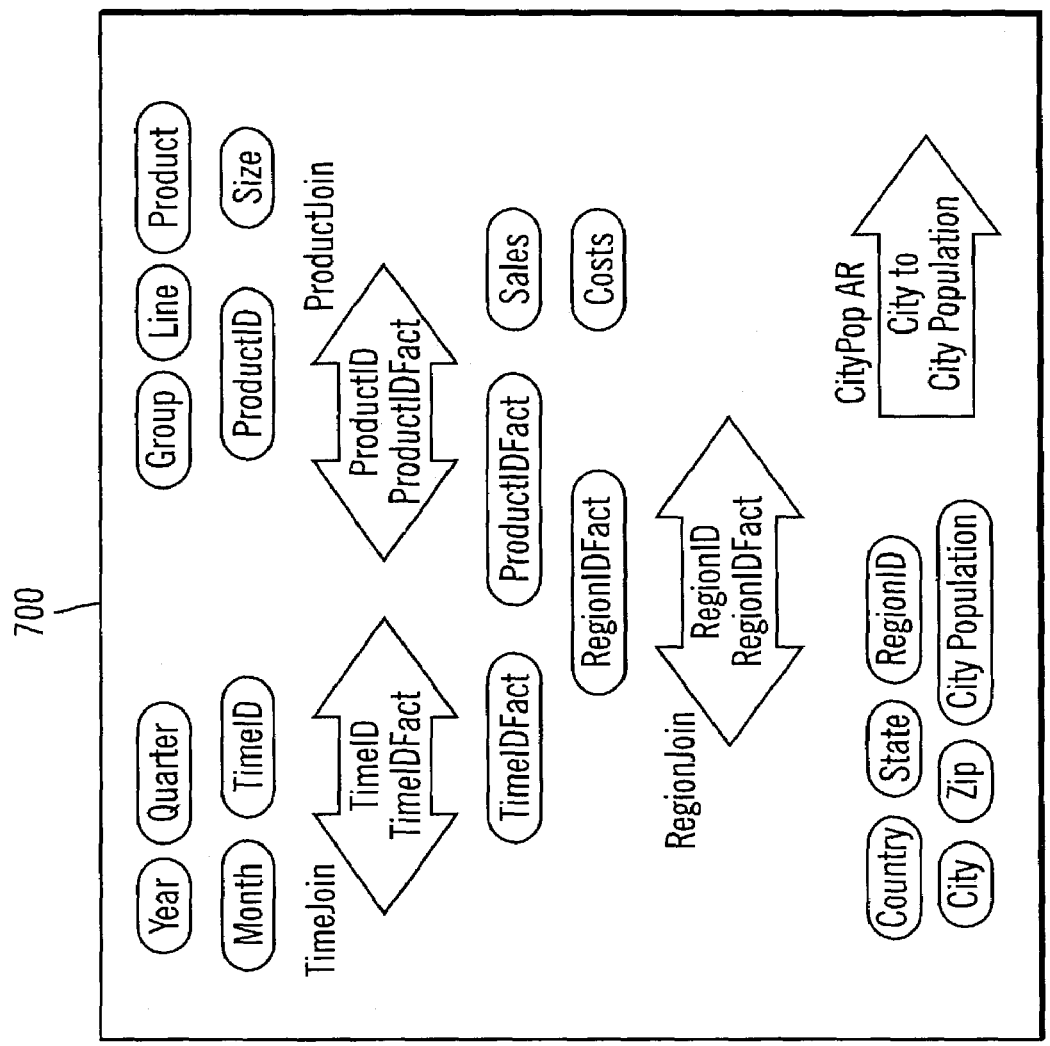
FIG. 7 illustrates that metadata objects corresponding to a Base/Relational layer are created in accordance with certain implementations of the invention.

FIG. 7 illustrates that metadata objects 700 corresponding to a Base/Relational layer are created in accordance with certain implementations of the invention. Attributes are created for all the dimension tables columns, and fact table columns used in joins. One measure metadata object is created for each fact column in the fact table. The joins used in this star-join schema are captured by the three join metadata objects. The join metadata objects specify how to join corresponding attributes of the fact table and dimension tables. One attribute relationship in the Region dimension table is created to represent the relationship between City and City_Population, and the fact that every value in the City attribute determines a value in the City_Population attribute.

Figure 8:
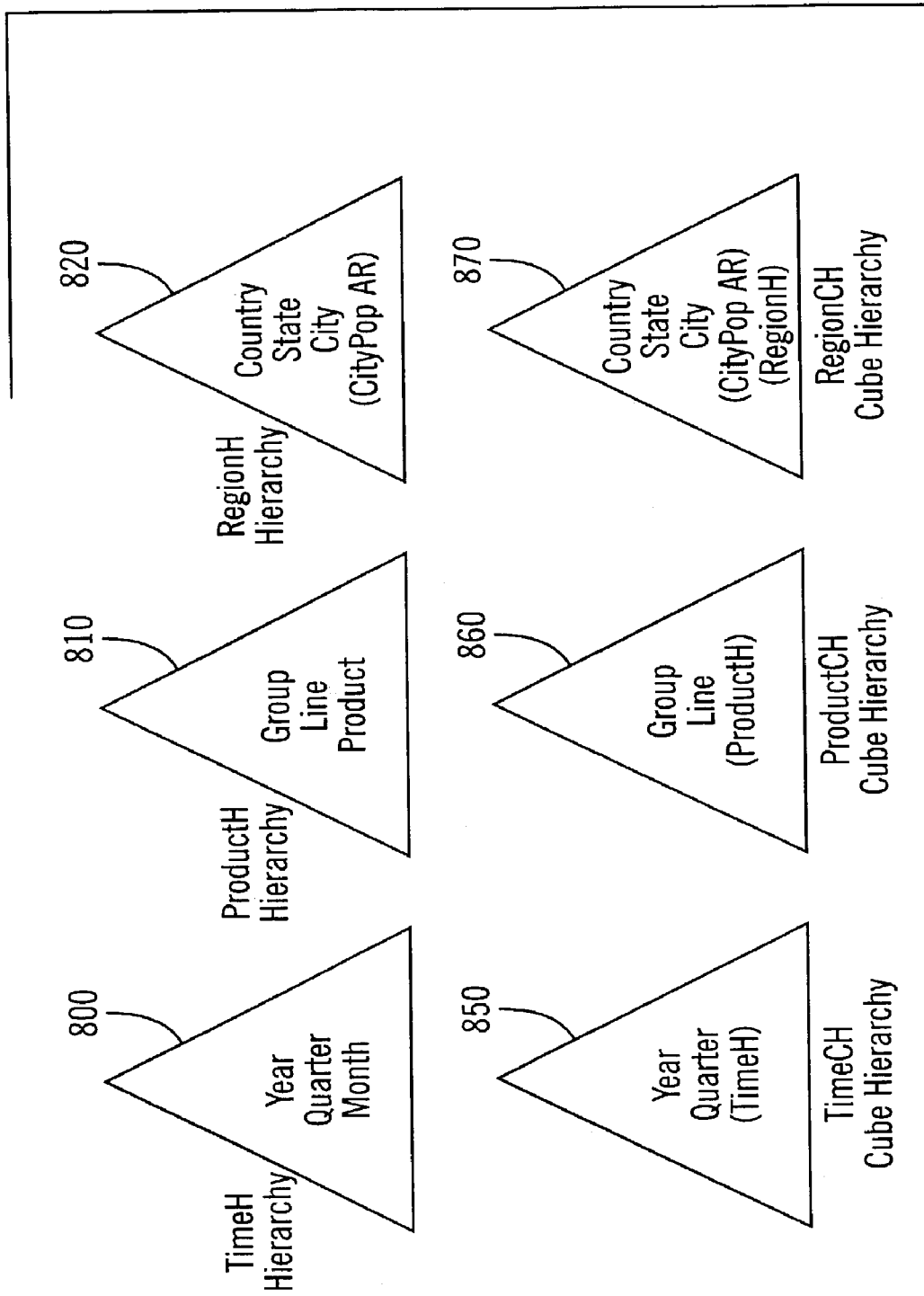
FIG. 8 illustrates additional metadata objects from the Base/Relational layer in accordance with certain implementations of the invention.

FIG. 8 illustrates additional metadata objects from the Base/Relational layer in accordance with certain implementations of the invention. Three hierarchies 800, 810, 820 are created, indicating the relationships among related attributes. These hierarchies 800, 810, 820 are used in the multidimensional layer by dimensions in order to create a means to calculate and navigate the dimension. In the RegionH hierarchy 820, the CityPop AR attribute relationship is referenced. All attribute relationships that apply to a given hierarchy are captured. One cube hierarchy 850, 860, 870 per hierarchy is also created in order to be used in a cube context. The cube hierarchies 850, 860, 870 are used to scope the levels of a hierarchy that are interesting for a given cube. A cube hierarchy 850, 860, 870 also captures attribute relationships that apply to it.

Figure 9:
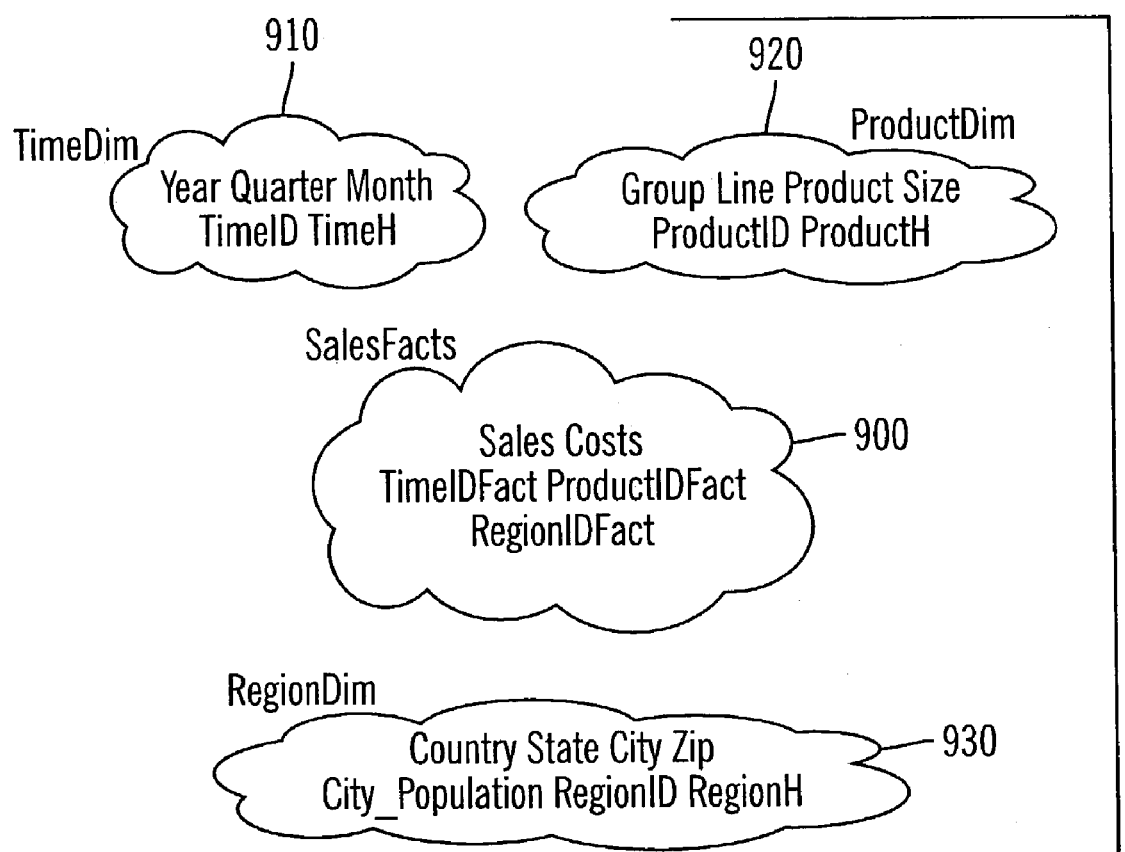
FIG. 9 illustrates multidimensional layer metadata objects created based on a star-join schema in accordance with certain implementations of the invention.

FIG. 9 illustrates multidimensional layer metadata objects created based on a star-join schema in accordance with certain implementations of the invention. One Facts metadata object 900 is created for the fact table Fact. The SalesFacts metadata object 900 includes the measures available and the attributes needed in the facts to dimension joins. One dimension metadata object 910, 920, 930 is created for each dimension table that is part of the star-join schema. A dimension metadata object groups attributes that are highly correlated, coming from a single dimension table in this example. A dimension metadata object also references hierarchies that apply on attributes of a dimension. Dimensions can have multiple hierarchies defined, however, in the example, only one hierarchy is defined per dimension.

Figure 10:
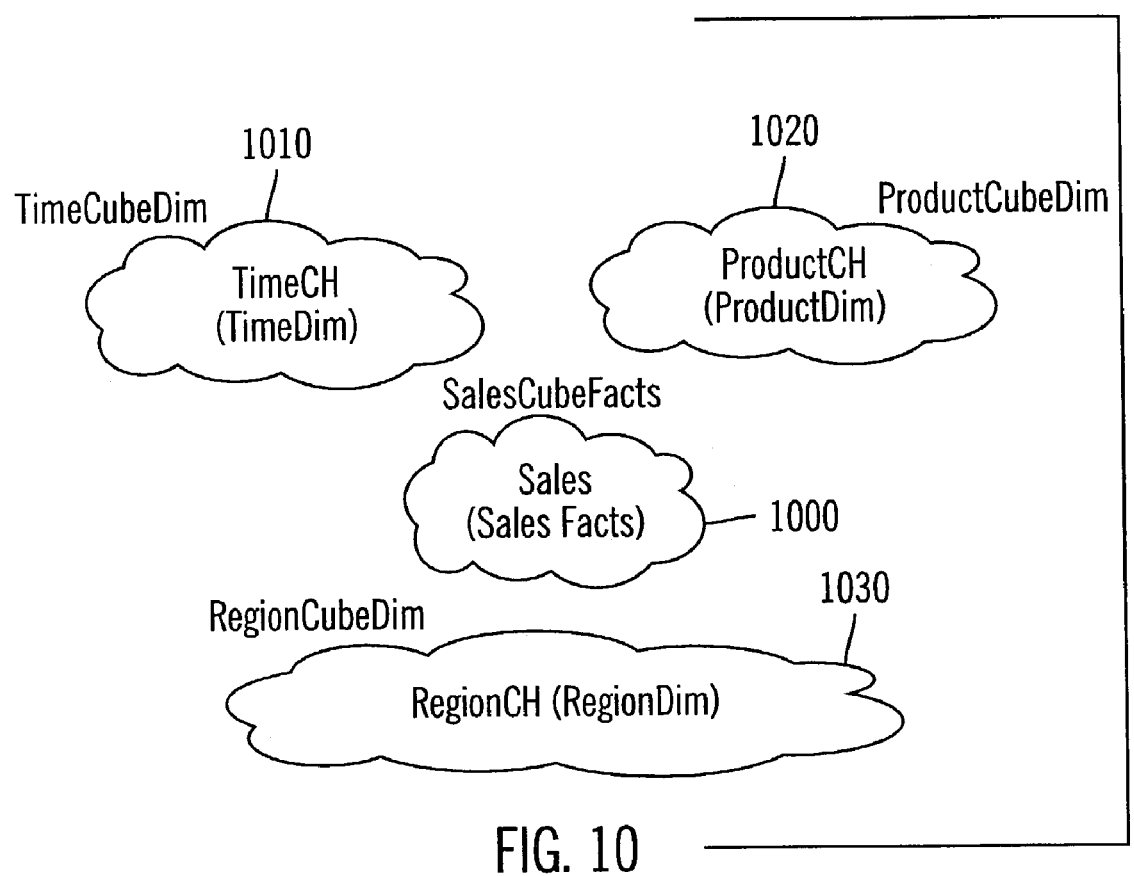
FIG. 10 illustrates instances of metadata objects used to define a cube in accordance with certain implementations of the invention.

FIG. 10 illustrates instances of metadata objects 1000, 1010, 1020, 1030 used to define a cube in accordance with certain implementations of the invention. A cube facts, cube dimension, and cube hierarchy metadata objects are used to scope the attributes and measures that are part of a cube. Each of these metadata objects references the metadata object that is being scoped, and all structural information, such as joins, is kept in the main (i.e., parent) metadata object. All cube specific objects hold a reference to a main object from which they were defined. For example, the cube hierarchy metadata object has a reference to the hierarchy metadata object from which the cube hierarchy metadata object was defined. In certain implementations, for cube dimensions, one hierarchy is assigned. In the example, a cube fact SalesCubeFacts 1000 is created and lists the measure (Sales) that is used in the cube.

The OLAP layer is composed by cube model and cube metadata objects. A cube model metadata object describes the facts and dimensions that are interesting to a given application. The dimensions of a cube model metadata object can have multiple hierarchies defined, which makes a cube model metadata object a very flexible structure. A cube metadata object is derived from a cube model metadata object, and so all cube dimensions, cube hierarchies, and cube facts metadata objects are derived from the cube model metadata object. A difference between a cube model metadata object and a cube metadata object is that in a cube metadata object one hierarchy is defined per dimension, which makes it possible to retrieve a cube metadata object with a single SQL statement.

Figure 11:
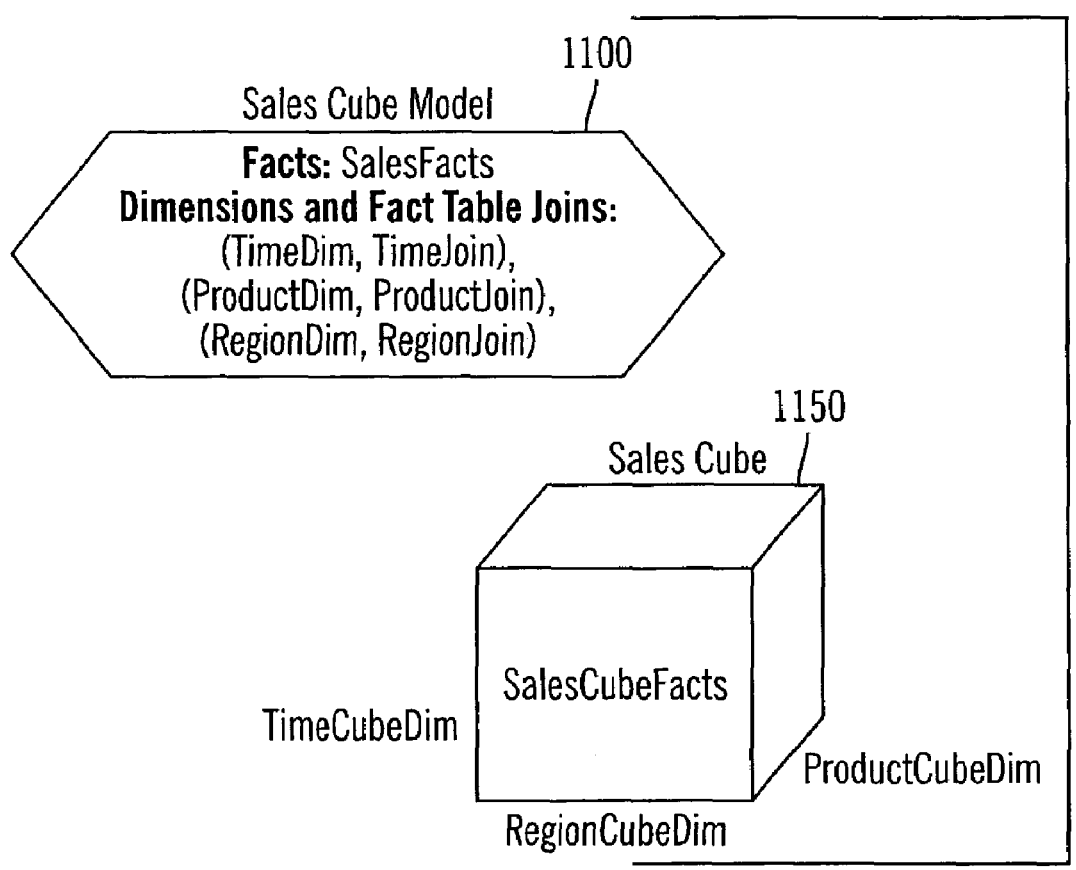
FIG. 11 illustrates that one instance of each metadata object in an on-line analytical processing (OLAP) layer is created in accordance with certain implementations of the invention.

FIG. 11 illustrates that one instance of each metadata object in an OLAP layer is created in accordance with certain implementations of the invention. The cube model created in the example captures one possible cube model 1100 generated from the example star-join schema of FIG. 3. A cube 1150 is created based on the cube dimensions TimeCubeDim, ProductCubeDim, RegionCubeDim and cube facts SalesCubeFacts.

A.2 Metadata Object Properties

Each metadata object has a set of general properties in addition to metadata object-specific properties. The general properties are used to identify the metadata object instances, to describe the usage or role of the metadata object instances, and to track metadata object instance changes. In certain implementations, the metadata objects are named using a schema in the same way that other database metadata objects are named. Full qualifications of the metadata object may be required when the default user name schema is not desired.

Table 1 describes the general properties that exist for all metadata objects.

TABLE 1

| Property | Description |
| --- | --- |
| Name | Name of the metadata object. |
| Schema | Schema that owns the metadata object. |
| Business name | Name presented to the end user. This name may be used in graphic user interfaces as a name more meaningful to the end user. |
| Comments | Textual description or comment on the nature or usage of the metadata object. |
| Create time | Time the metadata object was created. |
| Creator | User (schema) that defined the metadata object. |
| Modify time | Time the metadata object was last modified. |
| Modifier | User (schema) that performed the modification. |

In addition to a common set of general properties shared by all metadata objects, each metadata object has a set of metadata object specific properties. These metadata object specific properties describe the components and qualities that define the metadata object.

The cube model is a representation of a logical star schema. The cube model is a grouping of relevant dimension metadata objects around a central facts metadata object. Each dimension can have multiple hierarchies, which increases the cube model's flexibility. The structural information about how to join the tables used by the facts and dimension metadata objects is stored in the cube model. Also stored in the cube model is enough information to retrieve OLAP data. Other reporting and OLAP tools that understand the cube model and can handle multiple hierarchies of a specific dimension can benefit from the use of a cube model.

Cube models define a complex set of relationships and can be used to selectively expose relevant facts and dimensions to an application. Each join metadata object connecting a dimension to the central facts metadata object is stored with the corresponding dimension as a set. Subsets of cube model components can be used by many cubes for different analysis purposes.

An empty cube model may be created that does not have a facts metadata object or any dimensions. However, the cube model is completed before creating a corresponding cube. The OLAP multidimensional metadata system 100 validates a cube model by ensuring that the cube model includes a facts metadata object, at least one dimension, and joins between the existing facts and dimensions, and that all of the attributes reference valid tables. A hierarchy is not required to consider a cube model complete, however, to be able to define a cube from a cube model, at least one hierarchy per dimension is defined.

Each metadata object has a set of metadata object-specific properties that describe the components and qualities that define the metadata object. The metadata object specific properties of a cube model are described Table 2.

TABLE 2

| Property | Description |
| --- | --- |
| Facts | Facts used in the cube model. |
| Set of (dimension, join) | Dimensions that are used in the cube model and their corresponding joins. |

The facts metadata object groups related measures which are interesting to a given application. Multiple relational fact tables can be joined on specific attributes to map additional related measures. The facts metadata object stores information about the attributes used in fact to dimension joins, and the attributes and joins used to map the additional measures across multiple database tables. Therefore, in addition to a set of measures, a facts metadata object stores a set of attributes and a set of joins. A facts metadata object is used in a cube model as the center of a star schema.

The facts metadata object plays the role of a fact table in a star schema. Just as a fact table does, a facts metadata object gathers measurement entities, represented in the database catalog by measures. These need not come from the same table, allowing the designer to group measures as required for any OLAP application.

The metadata object specific properties of a facts metadata object are described in Table 3.

TABLE 3

| Property | Description |
| --- | --- |
| Set of measures | Set of all related measures in the facts metadata object. |
| Set of attributes | Set of all attributes used in the facts metadata object. |
| Set of joins | Set of all joins needed to join all of the specified measures and attributes. |

The dimension metadata object plays the role of a dimension table in a star schema. Dimensions group related attributes, which together describe some aspect of one or more measures. Thus, the dimension metadata object provides a way to categorize a set of related attributes that together describe one aspect of a measure. Dimensions are used in cube models to organize the data in the facts metadata object according to logical categories such as Region, Product, or Time. Related attributes and the joins needed to group these attributes together are defined in the dimension's metadata object specific properties.

Dimensions reference one or more hierarchies. Hierarchies describe the relationship and structure of the dimensional attributes and can be used to drive navigation and calculation of the dimension.

Dimensions also have a type that describes whether the dimension is time oriented. For example, a dimension called Time might contain attributes such as Year, Quarter, and Month, and would be a time type. Another dimension called Region might contain attributes such as Country, State, City, and Population and would be a regular type. Type information can be used by applications to intelligently and appropriately perform time related functions.

The metadata object specific properties of dimension metadata objects are described in the following Table 4.

TABLE 4

| Property | Description |
| --- | --- |
| Set of attributes | Set of all attributes used in the dimension. |
| Set of joins | Set of all joins needed to join all of the specified attributes. The joins needed to join the dimension tables are specified here. |

TABLE 4-continued

| Property | Description |
| --- | --- |
| Set of hierarchies | Set of hierarchies that apply to the dimension. |
| Type [REGULAR, TIME] | Dimension type. |

A hierarchy defines relationships among a set of one or more attributes within a given dimension of a cube model. Defining these relationships provides a navigational and computational means of traversing a given dimension. Multiple hierarchies can be defined for a dimension of a cube model. The hierarchy metadata object also references a set of attribute relationships that link attributes in the hierarchy to other related attributes. The attributes that are directly related by an attribute relationship can be queried as part of the hierarchy. For example, a hierarchy for a Region dimension can have a City attribute, and an attribute relationship can link City to a City_Population attribute. This hierarchy can include City_Population information in a query that includes City.

A hierarchy describes parent-child relationships among attributes. This information is referred to by a dimension to indicate how dimension members can be browsed, and how to aggregate data in the dimension.

The hierarchy type describes the relationship among the attributes within the hierarchy. The following four hierarchy types are supported: balanced, unbalanced, ragged, and network.

Figure 12:
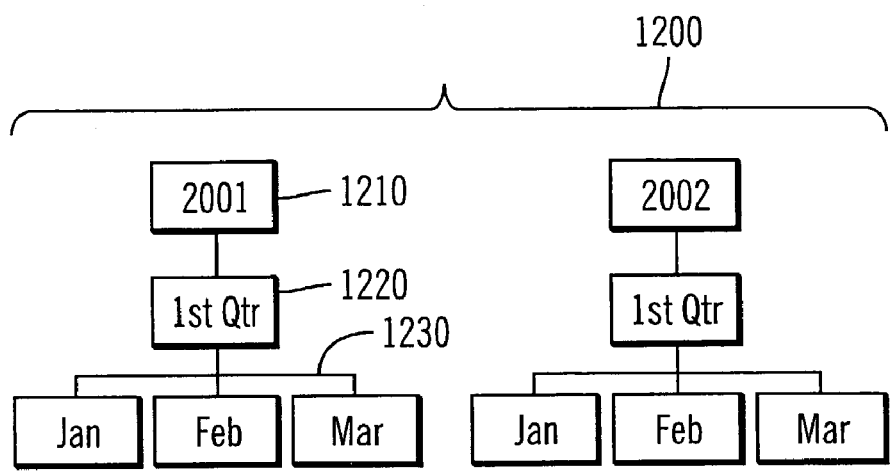
FIG. 12 illustrates an example of a balanced hierarchy in accordance with certain implementations of the invention.

FIG. 12 illustrates an example of a balanced hierarchy 1200 in accordance with certain implementations of the invention. A balanced hierarchy is one with meaningful levels and branches that have a consistent depth. Each attribute's logical parent is in the level directly above it. The balanced hierarchy 1200 represents time where the meaning and depth of each level, such as Year 1210, Quarter 1220 and Month 1230 is consistent.

Figure 13:
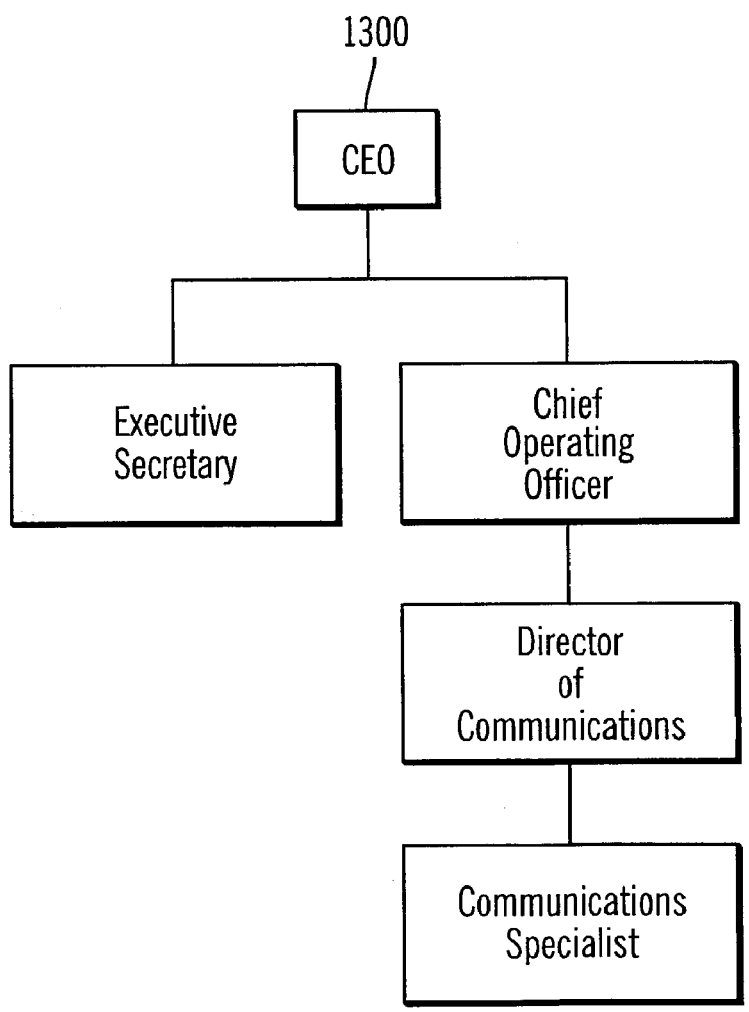
FIG. 13 illustrates an example of an unbalanced hierarchy in accordance with certain implementations of the invention.

FIG. 13 illustrates an example of an unbalanced hierarchy 1300 in accordance with certain implementations of the invention. An unbalanced hierarchy is one with levels that have a consistent parent-child relationship, but have an inconsistent semantic meaning for all members in a particular level. Also, the hierarchy branches have inconsistent depths. An unbalanced hierarchy can represent an organization chart. For example, the unbalanced hierarchy 1300 shows a CEO on the top level of the hierarchy and at least two of the people that might branch off below, including the chief operating officer and the executive secretary. The chief operating officer has many more people branching off also, but the executive secretary does not. There is a consistent parent-child relationship between the CEO and all of the people who report to the CEO. However the semantic meaning of the level directly below the CEO is inconsistent because of the different types of employees in that level.

Figure 14:
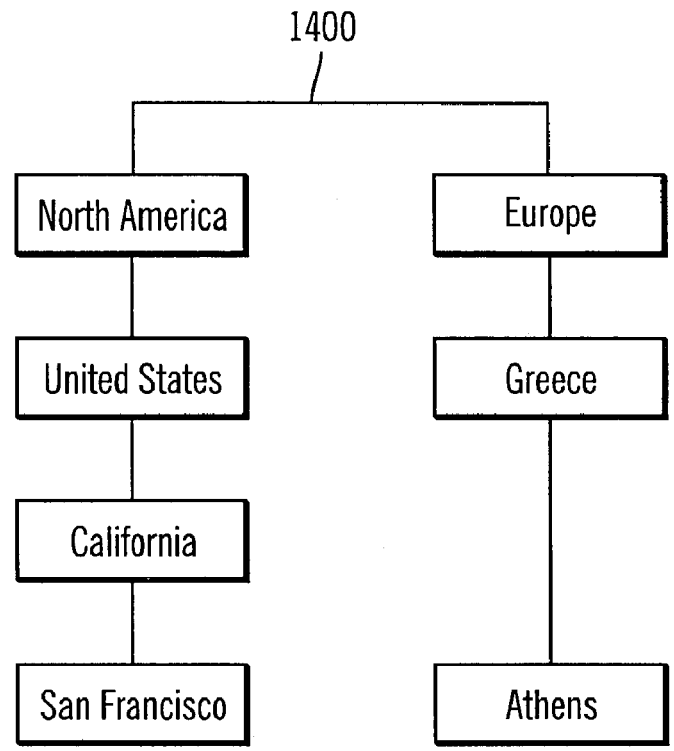
FIG. 14 illustrates a ragged hierarchy in accordance with certain implementations of the invention.

A ragged hierarchy is one in which each level has a consistent meaning, but the branches have inconsistent depths because at least one member attribute in a branch level is unpopulated. A ragged hierarchy can represent a geographic hierarchy in which the meaning of each level such as city or country is used consistently, but the depth of the hierarchy varies. FIG. 14 illustrates a ragged hierarchy 1400 in accordance with certain implementations of the invention. The ragged hierarchy 1400 shows a geographic hierarchy that has Continent, Country, Province/State, and City levels defined. One branch has North America as the Continent, United States as the Country, California as the Province/State, and San Francisco as the City. However the hierarchy 1400 becomes ragged when one member does not have an entry at all of the levels. For example, another branch has Europe as the Continent, Greece as the Country, and Athens as the City, but has no entry for the Province/State level because this level is not applicable to Greece. In this example, the Greece and United States branches descend to different depths, creating a ragged hierarchy 1400.

Figure 15:
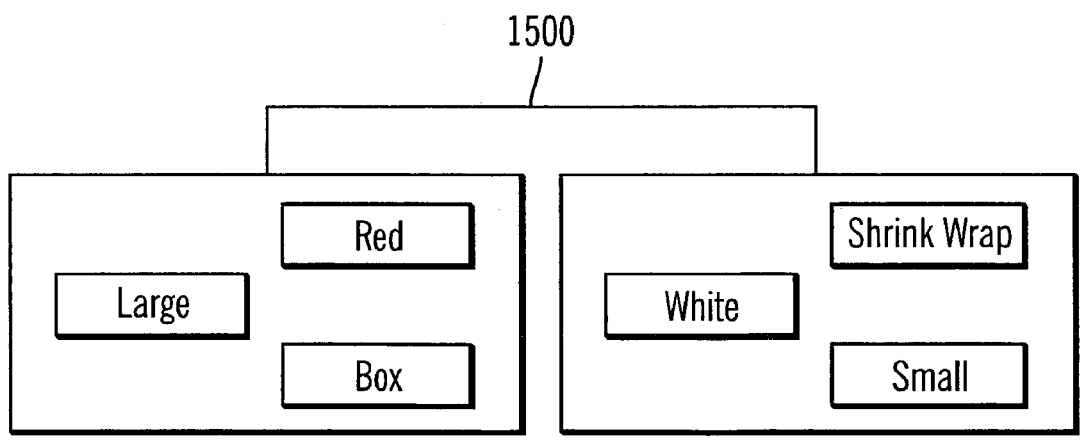
FIG. 15 illustrates a network hierarchy in accordance with certain implementations of the invention.

A network hierarchy is one in which the order of levels is not specified, but in which levels do have semantic meaning. FIG. 15 illustrates a network hierarchy 1500 that describes product attributes such as Color, Size, and PackageType in accordance with certain implementations of the invention. Because the attribute levels do not have an inherent parent-child relationship, the order of the levels may vary. A widget company might have member entries, such as white for Color, small for Size, and shrink wrap for PackageType. A second member entry might have red for Color, large for Size, and box for PackageType.

A hierarchy (balanced, unbalanced, ragged, or network) also specifies deployment mechanisms for the hierarchy. A deployment mechanism defines how to interpret the attributes of a hierarchy. The following two deployment mechanisms are supported: standard and recursive.

The standard deployment mechanism uses the level definitions of the hierarchy, where each attribute in the hierarchy defines one level. For example, a balanced hierarchy for a Time dimension would be organized by each defined level including Year, Quarter, and Month. Standard deployment can be used with all four hierarchy types. Table 5 shows how some of the balanced hierarchy attributes for a Time dimension are organized using a standard deployment.

TABLE 5

| Year | Quarter | Month |
| --- | --- | --- |
| 2001 | 1st quarter | January |
| 2001 | 1st quarter | February |
| 2001 | 1st quarter | March |
| 2002 | 1st quarter | January |
| 2002 | 1st quarter | February |
| 2002 | 1st quarter | March |

The recursive deployment mechanism uses the inherent parent-child relationships between the attributes of the hierarchy. An unbalanced hierarchy using a recursive deployment is represented as parent-child attribute pairs. For example, Table 6 shows the attribute pairs for the unbalanced hierarchy describing an organization chart shown in FIG. 13. The parent-child attribute pairs include: chief executive officer and executive secretary, chief executive officer and chief operating officer, chief operating officer and director of communications, director of communications and communications specialist. Recursive deployment may be used with an unbalanced hierarchy.

TABLE 6

| Parent Attribute | Child Attribute |
| --- | --- |
| Chief executive officer | Executive secretary |
| Chief executive officer | Chief operating officer |
| Chief operating officer | Director of communications |
| Director of communications | Communications specialist |

The metadata object specific properties of a hierarchy metadata object are described in the following Table 7.

TABLE 7

| Property | Description |
| --- | --- |
| List of attributes | Ordered list of attributes from the top to the bottom of a hierarchy. In the case of a recursive hierarchy, two attributes are used as parent and child. |
| Set of attribute relationships | Set of all attribute relationships that link hierarchy attributes to other attributes. |
| Type [BALANCED, UNBALANCED, RAGGED, NETWORK] | Hierarchy type. |
| Deployment [STANDARD, RECURSIVE] | Hierarchy deployment. |

A measure metadata object defines a measurement entity and is used in facts metadata objects. Measures become meaningful within the context of a dimension. For example, a revenue of 300 is not meaningful by itself. When a revenue measure is put in the context of a dimension, such as Region, the measure becomes meaningful. For example, the revenue for Vermont is 300. Common examples of measure metadata objects are Revenue, Cost, and Profit.

The measure object makes explicit the existence of a measurement entity. Measures are defined by one or more SQL expression which can be as simple as a mapping to a table column, or can involve multiple columns and other measures or attributes. For each measure, a list of aggregations is defined for calculations in the context of a cube model, or cube. Each aggregation in the list specifies a aggregation function, such as SUM, COUNT, MIN, MAX, and a list of dimension in which the aggregation function is applied. An empty list of dimensions in an aggregation indicates that all remaining dimensions, non-explicitly referenced in the measure, are to be used. A measure will have more than one SQL expression template when the first aggregation function used requires more than one input, such as CORRELATION. A measure can have an empty list of aggregations when it has a single SQL expression template, and it only refers to other measures. In this case, the aggregation of the referenced measures take place. Measures and attributes share the same name space, meaning that the names, when fully qualified by a schema, have to be unique among measures and attributes. Common examples for measures are Sales, Costs, Profit, etc.

Measures are defined by the aggregation of SQL expressions. Table columns, attributes and measures are mapped to a template to build SQL expressions (i.e., a "SQL expression template"). The resulting SQL expressions are then used as input for the first aggregation function of the measure. If a measure has more than one aggregation, the aggregation functions are performed in the order they are listed, with each subsequent aggregation taking the previous aggregation's result as its input. If the measure metadata object's SQL expression only references other measures, the aggregation function is optional. The aggregation function is optional because the referenced measures provide the aggregation.

A measure's SQL expression is created by the combination of two properties: a template and a list of columns, attributes, and measures. The template uses a token notation where {$$n} is the token and n references a specific column, attribute, or measure from the list. The list of columns, attributes, and measures is ordered and a column's, attribute's or measure's position in the list corresponds to the token n value.

SQL expressions are used as input to the first aggregation. Each aggregation specifies a function that is applied to a corresponding list of dimensions. The aggregation function can be any aggregation function supported by the underlying database, including, for example, SUM, COUNT, MIN, MAX, and CORRELATION. In certain implementations, each dimension is aggregated once by the measure metadata object. If the list of dimensions is empty, the aggregation function is applied to all dimensions in the cube or cube model that are not specifically being used by another aggregation in the list.

An example of a simple measure is Revenue. The Revenue measure can be created for a cube model with three dimensions: Product, Market and Time. Revenue has a SQL expression template (template="{$$1}"), which represents a simple mapping to the column specified in the one item list of columns, attributes, and measures, where list="Column Fact.Rev". The aggregation list is (SUM, <NULL>) where SUM is the aggregation function, and <NULL> is an empty list of dimensions. The SQL expression is used as input for the SUM aggregation function, resulting in the SQL: SUM (Fact.Rev).

A more complicated measure, Profit, might have a SQL expression template (template="{$$1}−{$$2}"), where the list of attributes, columns, and measures is list="Measure Revenue, Column Fact.Cost". Replacing the tokens with the correct references, the SQL expression becomes: "Revenue−Fact.Cost". Expanding the revenue measure reference to its column reference, the SQL expression becomes: "Fact.Rev−Fact.Cost". The Profit measure's aggregation list is: (SUM, <NULL>). Using the profit SQL expression as input for the SUM aggregation function, the Profit measure's SQL is: SUM(Fact.Rev−Fact.Cost).

If the measure has an aggregation function, such as CORRELATION, that requires two or more parameters, the measure will have two or more SQL expressions.

Measures also have a data type that is based on SQL data types. The OLAP multidimensional metadata system 100 automatically determines a measure's data type. Additionally, measures and attributes share the same name space. Therefore, each name, when fully qualified by a schema, is unique among measures and attributes. The metadata object specific properties of a measure metadata object are described in the following Table 8.

TABLE 8

| Property | Description |
| --- | --- |
| List of SQL expression templates | List of SQL expression templates used as input for the first aggregation function of the measure. The templates reference columns, attributes, and measures by using a '{$$n}' notation. In the template, n is an ordinal number corresponding to the list of columns, attributes, and measures. |
| List of columns, attributes, and measures | For each SQL expression template, an ordered list of columns, attributes, and measures is supplied. These columns, attributes, and measures are applied as specified in the SQL expression template. |
| List of aggregations (function, list of dimensions) | List of aggregations that specify how a measure is calculated. Each aggregation is composed by a SQL aggregation function and an optional list of dimensions to apply the function to. |

TABLE 8-continued

| Property | Description |
| --- | --- |
| Data type (schema, name, length, scale) | Determines the data type of the attribute. Based on SQL data types, and composed by data type schema, name, length, and scale. |

An attribute represents the basic abstraction of the database table columns. An attribute is defined by a SQL expression that can be a simple mapping to a table column, can involve multiple columns and other attributes, and can involve all functionalities of the underlying database, such as user-defined functions. In certain implementations, when other attributes are used in the defining SQL expression, the other attributes cannot form attribute reference loops. For example, if Attribute A references Attribute B, then Attribute B cannot reference Attribute A.

An attribute's SQL expression definition is created by the combination of two properties: a template and a list of columns and attributes. The template uses a token notation where {$$n} is the token with n referencing a specific column or attribute from the list. The list of columns and attributes is ordered, and a column's or attribute's position in the list corresponds to the token n value.

For example, the template (template="{$$1}||"||{$$2}") can be used with a corresponding list such as list="Column CUSTOMER.FIRSTANME, Attribute LastName" to concatenate customers' first and last names with a space between them. Replacing the template tokens with the correct list references, the SQL expression is: "Customer.FirstName||"||LastName". The attribute reference is further expanded to a column reference to form the SQL expression: "Customer.FirstName||"||Customer.LastName".

An attribute can serve multiple roles in the design of a data warehouse or data mart. The roles that an attribute can serve are: level, description, dimensional attribute, dimensional key, or key.

A level attributed is used in hierarchies. Examples of common level attributes are: Year and Quarter, State and City. A description attribute is used in a description type of attribute relationship and associates additional descriptive information to another attribute. For example, a table called Product might have an attribute with a product code and a description attribute with a textual description. The dimensional attribute is used in a dimensional type of attribute relationship and defines specific characteristics and qualities of another attribute. Examples of common dimensional attributes are: Population, Size, and Weight. The dimensional key attribute is used to join facts and dimension metadata objects and represents the primary key in a dimension table, or a foreign key from a dimension table to be used in a fact table. The key attribute is used to join tables within a facts or dimension metadata object. Key attributes are often used in a snowflake schema.

Attributes and measures share the same name space. Therefore, each name, when fully qualified by a schema, is unique among attributes and measures. Attribute and measure metadata objects are abstractions of a relational database column. However, they are defined by an SQL expression that can include multiple columns. Measures are more specialized than attributes—they include aggregation functions (column functions) that are used to calculate higher-level summaries from lower-level data.

The following Table 9 describes the metadata object specific properties that define an attribute metadata object.

TABLE 9

| Property | Description |
| --- | --- |
| SQL expression template | SQL expression that defines the attribute. The template references columns and attributes by using a {$$n} notation, where n is an ordinal number corresponding to the list of columns and attributes. |
| List of columns and attributes for SQL expression | Ordered list of all columns and attributes composing the attribute. These columns and attributes are applied as specified in the SQL expression template. |
| Data type (schema, name, length, scale) | Determines the data type of the attribute. Based on SQL data types, and composed by data type schema, name, length, and scale. |
| Role [LEVEL, DESCRIPTION, DIMATTR, DIMKEY, KEY] | This is optional. Roles that the attribute serves. |

An attribute relationship describes relationships of attributes in general. The relationships are described by a left and a right attribute, a type, a cardinality, and whether or not the relationships determine a functional dependency. The type describes what the role of the right attribute is with respect to the left attribute. For example, a ProductName right attribute describes a ProductCode left attribute. The relationship type between ProductName and ProductCode is DESCRIPTION. The cardinality describes how the instances of the left and right attributes are related and it is interpreted based on cardinality. In a 1:1 cardinality, there is at most one left attribute instance for each right attribute instance, and at most one right attribute instance for each left attribute instance. In a 1:N cardinality, there is at most one left attribute instance for each right attribute instance, and any number of right attribute instances for each left attribute instance. In a N:1 cardinality, there is any number of left attribute instances for each right attribute instance, and at most one right attribute instance for each left attribute instance. In a N:N cardinality, there is any number of left attribute instances for each right attribute instance, and any number of right attribute instances for each left attribute instance.

The functional dependency property tells whether the attribute relationship can also be used as a functional dependency. A functional dependency defines a functional relationship between two attributes. For example, a functional dependency can be defined between attributes such as City and Mayor or Product and Color. The functional dependency tells that every City value determines a Mayor value or that every Product value determines a Color value. This means that the cardinality described in the relationship is set by the designer, which is useful for query optimizations.

One use of an attribute relationship is within the context of a hierarchy in a dimension. Attributes that are directly related to the hierarchy attributes can be queried as part of the hierarchy. This allows each level of the hierarchy to define attributes that complement the information of a given level. For example, a hierarchy can have a City attribute. The City attribute can be related to a City_Population attribute with an attribute relationship. With the attribute relationship information, City_Population information can be included in a query that includes City.

The metadata object specific properties defining an attribute relationship metadata object are described in the following Table 10.

TABLE 10

| Property | Description |
| --- | --- |
| Left attribute | Left attribute used in the relationship. |
| Right attribute | Right attribute used in the relationship. |
| Type [DESCRIPTION, ASSOCIATED] | Type of relationship described by the attribute relationships. The type is used to determine what role an attribute plays. |
| Cardinality [1:1, 1:N, N:1, N:N] | Cardinality expected in the join. |
| Functional dependency [YES, NO] | Determines if the attribute relationship is also a functional dependency. |

The join metadata object joins relational tables that are referenced by two metadata objects. Two metadata objects can be joined on one or more pairs of attribute metadata objects mapping to relational table columns. In a facts to dimension join, a join metadata object joins attributes from the facts metadata object and attributes from the dimension metadata object. In a composite join, the set of attribute pairs is from the same set of tables. For example, to join relational Table1 with a compound key of FirstName and LastName, with a relational Table2 that has a compound key of FName and Lname, one relational join with two join predicates is used; one join predicate for Table1.FirstName and Table2.FName, a second join predicate for Table1.LastName and Table2.LName. The information about this composite join is stored in one join metadata object.

The join metadata object is defined by a list of the left attribute, right attribute, and join operator. Also, the join type and expected cardinality are specified. Joins can be used between two facts, two dimensions, or a fact and a dimension. Join metadata objects are referred to by cube model, facts, and dimension metadata objects.

The metadata object specific properties that define a join metadata object are described in the following Table 11.

TABLE 11

| Property | Description |
| --- | --- |
| List of (left attribute, right attribute, operator) | Left attribute: The attribute on the left side of the join. Right attribute: The attribute on the right side of the join. Operator: Operator expected in the join [=, <, >, <>, >=, <=]. |
| Type [INNER, FULL OUTER, LEFT OUTER, RIGHT OUTER] | Type of join expected. |
| Cardinality [1:1, 1:N, N:1, N:N] | Cardinality expected in the join. |

A cube is a very precise definition of an OLAP cube that can be delivered using a single SQL statement. Each cube is derived from a single cube model. The cube facts and list of cube dimensions are subsets of those in the referenced cube model. A cube view name is also defined which represents the cube in the database. Cubes are appropriate for tools and applications that do not use multiple hierarchies because cube dimensions allow one cube hierarchy per cube dimension.

The purpose of a cube is to define a standard relational view of an OLAP structure. In addition to the relational view, a cube provides an extended describe (e.g., as an XML document) that describes the roles of its columns in multidimensional terms. In the process of defining a cube, the designer selects a subset of the possible elements, choosing a single hierarchy for each dimension. This ensures that the cube unambiguously defines a single relational result set. The simplicity of a cube makes the cube useful to less sophisticated OLAP applications, such as portable devices powered by World Wide Web ("Web") services.

The metadata object specific properties of a cube metadata object are described in the following Table 12.

TABLE 12

| Property | Description |
| --- | --- |
| Cube model | Cube model from which the cube is derived. |
| Cube facts | Cube facts used in the cube. The cube facts is derived from the facts metadata object in the cube model. |
| List of cube dimensions | Ordered list of cube dimensions used in the cube. The cube dimension is derived from the dimensions in the cube model. One cube hierarchy is associated with each cube dimension. |
| Cube view | View in the database that represents the cube. |
| Extended Describe | XML document describing roles of columns and their relationships in terms of a multidimensional model |

A cube facts metadata object has a subset of measures in an ordered list from a specific facts metadata object. A cube facts metadata object gives a cube the flexibility to scope a cube model's facts. The structural information, such as the joins and attributes, is referenced from the parent facts metadata object. The metadata object specific properties that define a cube facts metadata object are described in the following Table 13.

TABLE 13

| Property | Description |
| --- | --- |
| Facts | Facts from which the cube facts is derived. |
| List of measures | Ordered list of measures used in a cube. All measures are part of the facts from which the cube facts is derived. |

A cube dimension metadata object is used to scope a dimension for use in a cube. The cube dimension metadata object references the dimension from which it is derived and the relevant cube hierarchy for the given cube. In certain implementations, one cube hierarchy can be applied to a cube dimension. The joins and attributes that apply to the cube dimension are referenced from the dimension definition. The metadata object specific properties that define a cube dimension metadata object are described in the following Table 14.

TABLE 14

| Property | Description |
| --- | --- |
| Dimension | Dimension from which the cube dimension is derived. |
| Cube hierarchy | Cube hierarchy that applies to the cube dimension. |

A cube hierarchy metadata object is a scoped version of a hierarchy and is used in a cube. A cube hierarchy references the hierarchy from which it is derived and can have a subset of the attributes from the parent hierarchy. Additionally, a cube hierarchy metadata object references the attribute relationships that apply on the cube. In certain implementations, one cube hierarchy can be defined for a cube dimension of a cube. A cube hierarchy metadata object has the same hierarchy types and deployment mechanisms as the hierarchy from which the cube hierarchy metadata object is derived.

A cube hierarchy is very similar to a hierarchy; however, a cube dimension refers to a single cube hierarchy. This allows a single SELECT statement to calculate the cells of a cube.

The metadata object specific properties that define a cube hierarchy metadata object are described in the following Table 15.

TABLE 15

| Property | Description |
| --- | --- |
| Hierarchy | Hierarchy from which the cube hierarchy is derived. |
| Lists of attributes | Ordered list of all attributes from the top to the bottom of the cube hierarchy. The order of the attributes should be the same as in the parent hierarchy. |
| Set of attribute relationships | Set of all attribute relationships that link cube hierarchy attributes to other attributes. |

Figure 16:
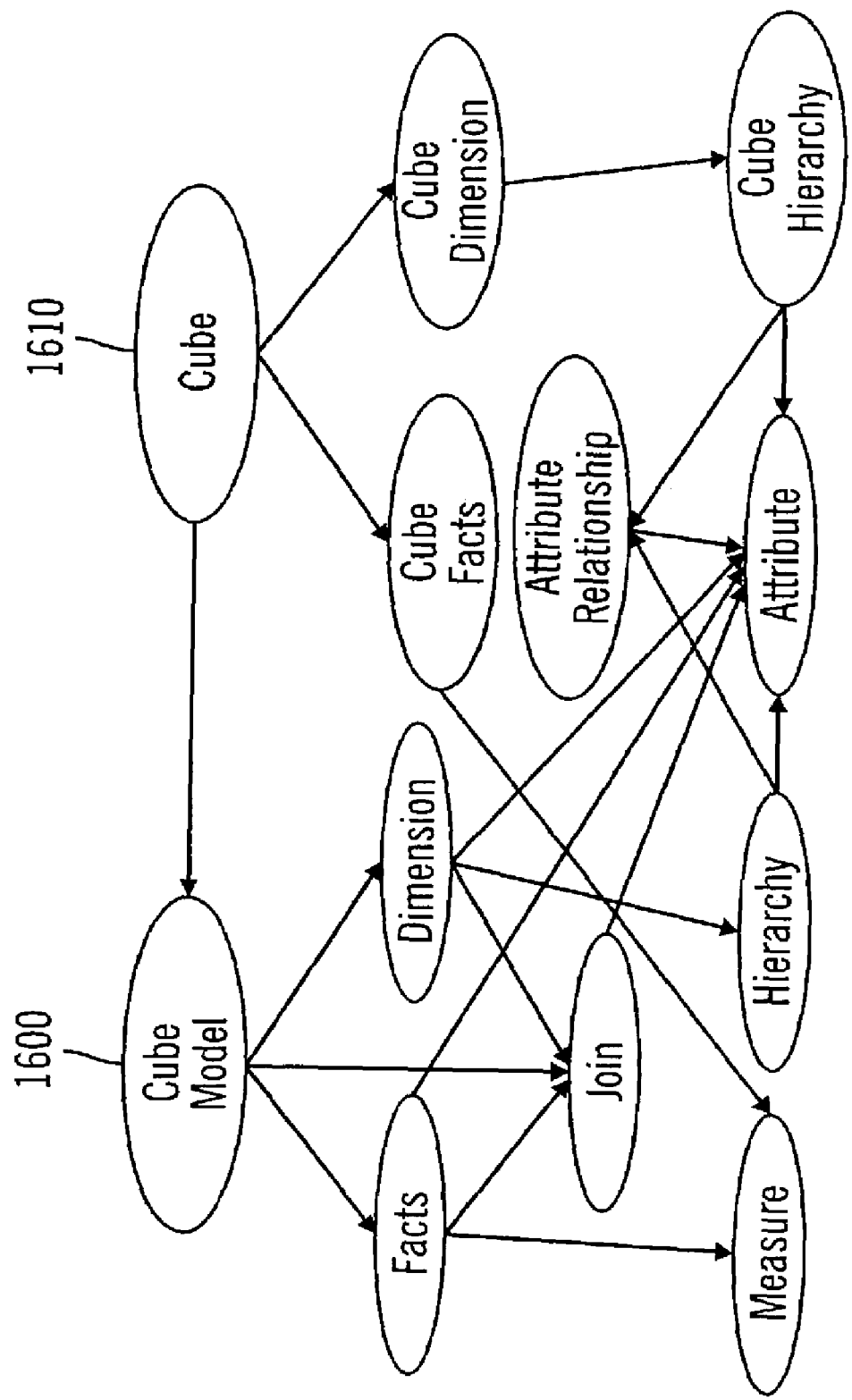
FIG. 16 illustrates some relationships among some metadata objects in accordance with certain implementations of the invention.

FIG. 16 illustrates some relationships among some metadata objects in accordance with certain implementations of the invention. The arrows indicate that a metadata object references another metadata object. For example, a cube metadata object 1610 references a cube model metadata object 1600. A more detailed relationship description of the metadata objects is illustrated in Table 16.

TABLE 16

| Metadata object 1 | References | Metadata object 2 |
| --- | --- | --- |
| Cube Model | zero or one | Facts |
| Cube Model | zero or more | Dimension/Join |
| Cube | one | Cube model |
| Cube | one | Cube Facts |
| Cube | one or more | Cube Dimension |
| Facts | one or more | Measure |
| Facts | zero or more | Attribute |
| Facts | zero or more | Join |
| Dimension | one or more | Attribute |
| Dimension | zero or more | Join |
| Dimension | zero or more | Hierarchy |
| Cube Facts | one | Facts |
| Cube Facts | one or more | Measure |
| Cube Dimension | one | Dimension |
| Cube Dimension | one or more | Attribute |
| Cube Dimension | one | Cube Hierarchy |
| Hierarchy | one or more | Attribute |
| Hierarchy | zero or more | Attribute Relationship |
| Cube Hierarchy | one | Hierarchy |
| Cube Hierarchy | one or more | Attribute |
| Cube Hierarchy | zero or more | Attribute Relationship |
| Measure | zero or more | Measure |
| Measure | zero or more | Attribute |
| Measure | zero or more | Dimension |
| Attribute | zero or more | Attribute |
| Attribute Relationship | two | Attribute |
| Join | multiple of two (minimum of two) | Attribute |

In accordance with certain implementation, there is a metadata object naming convention and rules for naming. Naming conventions and rules other than those described herein may be used without departing from the scope of the invention. There are two different naming conventions to name objects: ordinary and delimited. For the metadata objects, due to its flexibility, the delimited convention is used when naming objects and referring to database tables and columns. The delimited convention allows mixed case names, spaces, and special characters, such as national language characters. The complete set of characters is determined by the codepage of the database in which the objects reside.

Besides the naming conventions, some rules apply to the different identifiers in the objects in certain implementations. For example, a schema has a length of 1–30 bytes and schema names do not begin with 'SYS'; a name has a length of 1–128 bytes; a business name has a length of 1–128 bytes; comments have a length of 0–254 bytes; a table schema (used in referencing columns) has a length of 1–128 bytes; a table name (used in referencing columns) has a length of 1–128 bytes; and a column name (used in referencing columns) has a length of 1–128 bytes.

In addition to the relationships that are enforced, additional rules are described for each metadata object. That is, every metadata object has its own set of rules, and an instance of a metadata object is valid if the metadata object follows all of the metadata object rules for that metadata object. The rules are separated in three categories: Base Rules, Cube Model Completeness Rules, and Optimization Rules. The following discussion of specific rules provides a set of rules for certain implementations of the invention. In other implementations, the set of rules for one or more metadata objects may be modified without departing from the scope of the invention.

The base rules for a cube model metadata object are: (1) the cube model metadata object refers to zero or one facts metadata object; (2) the cube model metadata object refers to zero or more dimension(s); (3) dimension-join pairs have both a dimension and a join; (4) a join associated with a dimension is valid if all attributes of one side of a join are found in the facts' attribute list and all other side attributes are found in the dimension's attribute list; and (5) for each measure referenced in the cube model's facts, all the explicit dimension references in the measure's aggregations are referenced by the cube model. When the cube model references at least one dimension, an aggregation with an empty list of dimensions matches to at least one dimension from the cube model that was not previously referenced.

The base rules for a cube metadata object are: (1) the cube metadata object refers to one cube facts; (2) the cube metadata object refers to at least one cube dimension; (3) cube facts is derived from the facts used in the cube model; and, (4) cube dimensions are derived from the dimensions used in the cube model.

The base rules for a facts metadata object are: (1) a facts metadata object refers to at least one measure; (2) all attributes and measures referenced by a facts are joinable; (3) in a facts metadata object context, a single join can be defined between two given tables; (4) there are no join loops in a facts metadata object; and, (5) all joins referenced by a facts metadata object refer to facts metadata object attributes.

The base rules for a dimension metadata object are: (1) the dimension metadata object refers to at least one attribute; (2) attributes referenced by a dimension are joinable; (3) there are no join loops; (4) in a dimension context, a single join is defined between any two given tables; (5) hierarchies referenced by a dimension refer to the dimension's attributes; (6) attribute relationships that are referenced by a dimension's hierarchies refer to the dimension's attributes; and (7) joins referenced by a dimension refer to the dimension's attributes.

The base rules for a cube facts metadata object are: (1) the cube facts metadata object refers to at least one facts; (2) the cube facts metadata object refers to at least one measure; and, (3) measures referenced by a cube facts metadata object are part of the facts metadata object.

The base rules for a cube dimension metadata object are as follows: (1) the cube dimension metadata object refers to one dimension; (2) the cube dimension metadata object refers to a cube hierarchy; and, (3) the cube hierarchy referenced by the cube dimension metadata object is derived from a hierarchy that is referenced dimension by the cube dimension metadata object's dimension.

The base rules for a hierarchy metadata object are: (1) the hierarchy metadata object refers to at least one attribute; (2) two attributes are required for a recursive deployment; (3) every attribute relationship within a hierarchy has a left attribute as part of the hierarchy; (4) every attribute relationship within the hierarchy has a cardinality of 1:1 or N:1; and, (5) certain combinations of hierarchy types and hierarchy deployments are allowed as indicated in Table 17:

TABLE 17

| Type/ Deployment | Standard | Recursive |
|---|---|---|
| Balanced | X | |
| Ragged | X | |
| Unbalanced | X | X |
| Network | X | |

The base rules for a cube hierarchy metadata object are: (1) the cube hierarchy metadata object refers to one hierarchy; (2) the cube hierarchy metadata object refers to at least one attribute; (3) attributes referenced by the cube hierarchy metadata object are part of the hierarchy; (4) the order of the attributes in the cube hierarchy metadata object are the same as in the hierarchy (with the exception of hierarchies defined as a network); (5) every attribute relationship within a hierarchy has a left attribute as part of the hierarchy; and, (6) attribute relationships referenced in the cube hierarchy metadata object are also referenced in the hierarchy that defines the cube hierarchy.

The base rules for a measure metadata object are: (1) a measure metadata object can have, as parameters for each SQL expression template, attributes, columns, measures, or none of them; (2) attributes and measures, used as SQL template parameters, can not generate a dependency loop among attributes and/or measures; (3) every SQL template defined in the measure metadata object is not an empty string; (4) the SQL template does not use aggregation functions; (5) aggregation is not required if at least one measure and only measures are referenced; (6) the number of SQL templates matches the number of parameters of the first aggregation function, if an aggregation is present; (7) a measure metadata object with multiple SQL templates defines at least one step in an aggregation script; (8) if measure metadata object A refers to measure metadata object B, which defines multiple SQL templates, then measure metadata object A does not have an aggregation script; this rule applies for all levels in a measure reference tree; (9) a multi-parameter aggregation function is used as the first aggregation; (10) if a measure metadata object defines one or more aggregations, one aggregation may have an empty list of dimensions; (11) within a measure metadata object, a dimension may not be referenced more than once either within an aggregation or across aggregations; (12) within a SQL expression template, token indicators (i.e., {$$#}) begin numbering with 1 and are consecutive with no numbering gaps; and, (13) within a SQL expression, every column, attribute and measure is referenced at least once.

The base rules for an attribute metadata object are: (1) an attribute metadata object can have, as parameters for the SQL template, attributes, columns, or none of them; (2) the attributes, used as parameters for SQL template, can not generate a dependency loop among attributes; (3) the SQL template can not be an empty string or blank string; (4) no aggregation function is allowed to be part of the SQL template; (5) within a SQL expression template, token indicators (i.e., {$$#}) begin numbering with 1 and are consecutive with no numbering gaps; and, (6) within a SQL expression, every column, attribute and measure is referenced at least once.

The base rules for an attribute relationship metadata object are: (1) the attribute relationship metadata object refers to two attributes; and, (2) the attribute relationship metadata object cannot be defined as having a cardinality=N:N and a functional dependency=YES.

The base rules for the join metadata object are: (1) the join metadata object refers to at least one triplet of left attribute, right attribute, and operator; (2) all left attributes in the join metadata object resolve into one or more columns of a single table; (3) all right attributes in the join metadata object resolve into one or more columns of a single table; and, (4) each triplet of the join metadata object defines a valid operation; the datatypes of left and right attributes, as well as the operation defined for them, are compatible.

The cube model completeness rules extend the base rules in order to ensure that a cube model has the required links to other metadata objects to allow effective warehouse SQL queries to be formed. The cube model completeness rules for a cube model metadata object are: (1) a cube model metadata object refers to one facts; (2) a cube model metadata object refers to one or more dimensions.

The optimization rules extend the cube model completeness rules in order to ensure that optimization of warehouse SQL queries can be performed.

The optimization rules for a cube model metadata object is: (1) the join used in the facts to dimension has a cardinality of 1:1 or N:1 and joins a facts' table to a dimension's primary table.

The optimization rules for a dimension metadata object is: (1) considering the join network formed by the dimension's joins, there is at least one table, primary table, in which all joins radiating from this table have cardinality of N:1 or 1:1.

The optimization rules for a join metadata object are: (1) there is a constraint defined on the columns that participate in the join; if the join is a self-join, i.e. the same set of columns is used in both sides of the equality, a primary key is defined matching the set of columns; in all other cases, when the set of columns of one side are different from the other side of the join, a primary key matches the columns of one side of the join, and a foreign key matches the other set of columns as well as references the primary key; (2) the join cardinality is 1:1, N:1 or 1:N; if the join is a self-join, the cardinality is 1:1; in all other join cases, the cardinality is 1 on the side in which a primary key is defined and N on the side in which a foreign key is defined; if the foreign key side has also a primary key defined on it, a 1 is used as cardinality; (3) all attributes used in the join resolve to non-nullable SQL expressions; and, (4) the join type is INNER JOIN.

A.4 Metadata Object Example

Figure 17:
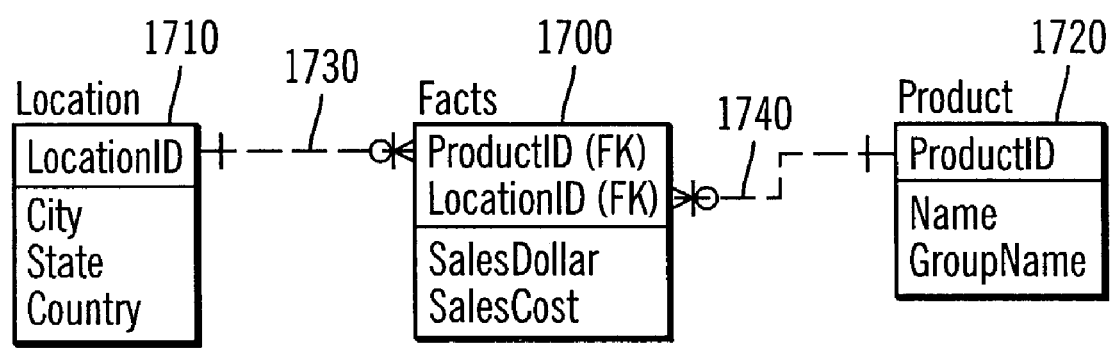
FIG. 17 illustrates a star schema composed of two dimension tables and a fact table in accordance with certain implementations of the invention.

FIG. 17 illustrates a star schema composed of two dimension tables 1710, 1720 and a fact table 1700 in accordance with certain implementations of the invention. Two lines 1730, 1740 represent joins between the fact table 1700 and the dimension tables 1710, 1720. In certain implementations, a database designer, using a modeling tool or user interface 150, may create metadata object instances for metadata objects 130. Most metadata objects 130 defined during the generation of the multidimensional metadata can be reused for a new model if the metadata objects overlap with the new model. FIGS. 18A–18E illustrate a possible set of metadata object instances, and, for simplicity, some properties of metadata objects, that may be generated for the star schema of FIG. 17 in accordance with certain implementations of the invention. In particular, some of the omitted properties in FIGS. 18A–18E are common properties. For example, FIGS. 18A–18E illustrate a cube model metadata object instance 1800, a cube metadata object instance 1802, a facts metadata object instance 1804, a cube facts metadata object instance 1806, measure metadata object instances 1808, 1810, dimension metadata object instances 1812, 1814, cube dimension metadata object instances 1816, 1818, hierarchy metadata object instances 1820, 1822, 1824, cube hierarchy metadata object instances 1826, 1828, join metadata object instances 1830, 1832, and attribute metadata object instances 1834–1848.

A user may use the user interface 150 to create metadata objects. After creating an empty cube model metadata object, a facts metadata object and dimension metadata objects are created and joined to the cube model metadata object by creating appropriate join metadata objects.

B. Use of Cube Views and Extended Describe to Create Multidimensional Cubes in a Relational Database Certain implementations of the invention create and describe cube views in a relational database such that the resulting cube views behave similarly to multidimensional databases. In particular, the invention provides metadata extensions (i.e., metadata objects) that allow designers of multidimensional schemas to describe the structure of those schemas to multidimensional query and analysis tools. Moreover, SQL (Structured Query Language) extensions include new operators, such as ROLLUP, CUBE, and GROUPING SETS. In implementations of the invention, the ROLLUP operator is used to create a multidimensional result set, which will include all slices of a cube.

B.1 Super Aggregate Operators

Figure 19:
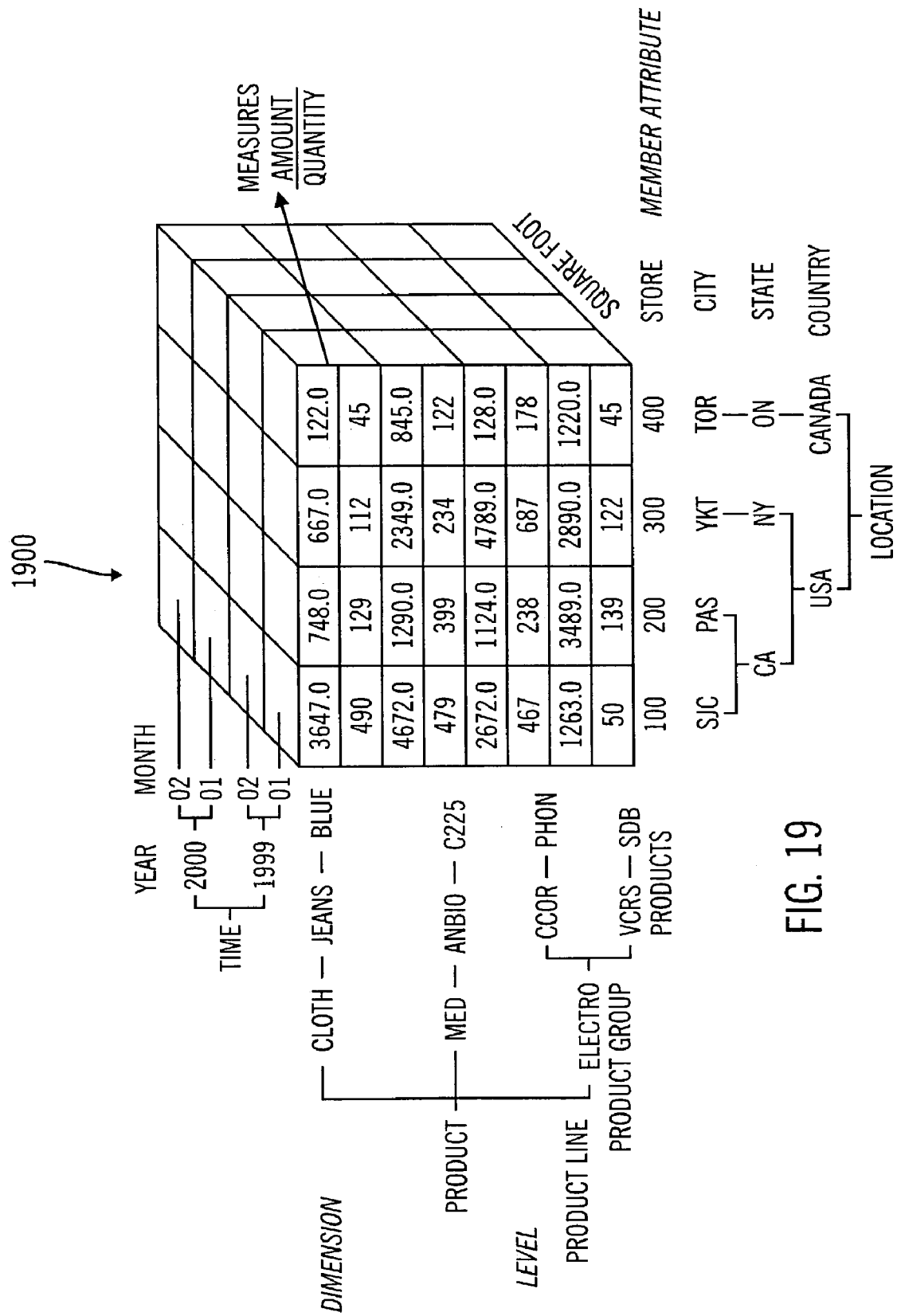
FIG. 19 illustrates a simple, three-dimensional on-line analytical processing (OLAP) cube in accordance with certain implementations of the invention.

FIG. 19 illustrates a simple, three-dimensional OLAP cube 1900 in accordance with certain implementations of the invention. Each dimension of the cube 1900 comprises a set of related members. In the example, product, time, and location are the dimensions of the cube 1900. The members of the location dimension are location, USA, Canada, CA, NY, ON, SJC, PAS, YKT, and TOR. Members of a dimension are usually organized into a hierarchy of levels that show the parent-child relationships of the levels within a dimension. Levels are sets of members that share a number of common attributes. In the example, the elements SJC, PAS, YKT, and TOR belong to the city level. This level has a member attribute of "square_foot"—the size of each store in square feet. Although not shown in the example, the city level might also have attributes that include "mayor," while the state level might have attributes that include "governor." Note that if members at a particular level of a hierarchy are not unique (for example, 01 and 02 in the time dimension), they are combined with parent identifiers to form unique member names (1999–01, for example).

In order to show the hierarchical relationship of the members in FIG. 19, aggregate members such as 1999 and SJC are not explicitly shown as identifiers of a slice of the cube 1900. However, conceptually all members on an edge do identify such a slice. So, (1999, VCRS, SJC) describes a cell of the cube 1900, in the same way that (1999–01, RCA, SJC) describes a cell of the cube 1900. Each cell of the cube 1900 contains a vector of two values: amount and quantity. Sometimes it is convenient to consider these vectors of values as another dimension of a cube 1900.

This view of an OLAP cube 1900 does not explicitly describe how values are computed. Usually, hierarchical relationships imply simple aggregation (e.g., CA=SJC+ PAS). In many models, the mathematical relationships in a hierarchy are more complex, and they vary depending on the nature of the measurements. For example, in a cube measuring sales and inventory, sales values may be summed by time period, whereas average or final values are more appropriate for inventory. In many cases (particularly with costs), only aggregate values are available and an OLAP system is used to allocate those costs down to lower levels.

Because the number of cells in a cube is the product of the size of each dimension, OLAP cubes can be very large. Consider the possibility of a large enterprise with 1000000 customers, 100000 products, 2500 time periods, and 25 measurements. An OLAP system implementing such a cube has to deal with the potential of 6250000000000000 cells. The number of potential cells is usually several orders of magnitude greater than the number of populated cells, thus the OLAP multidimensional metadata system 100 is designed to handle very sparsely populated matrices.

FIG. 20 illustrates views of a sample cube 1900 that is typical of grid-based OLAP viewers (i.e., query processors) in accordance with certain implementations of the invention. From any such view, OLAP systems typically provide operations that allow an analyst to quickly switch to a related view. Operations typically provided include: drill down, drill up, and pivot. Drill down refers to navigating a dimension from lesser detail to greater detail. Table 2000 shows the result of drilling down one level in the location dimension. Drill up refers to navigating in a dimension from greater detail to lesser detail. Table 2010 shows the result of drilling up one level, to the top of the product dimension. Pivot refers to rearranging the ordering of dimensions in a result. Table 2020 shows the result of switching the product and time dimensions in the display grid.

Relational databases have been used extensively for multidimensional analysis for many years. By far the most common approach is to organize the data in what is called a star schema. The simplest star schemas consist of a fact table joined with a number of dimension tables. The fact table contains one column for each dimension, plus one column for each measure. A great deal has been written on the techniques for designing star schemas and optimizing the calculation of derived results.

Figure 21:
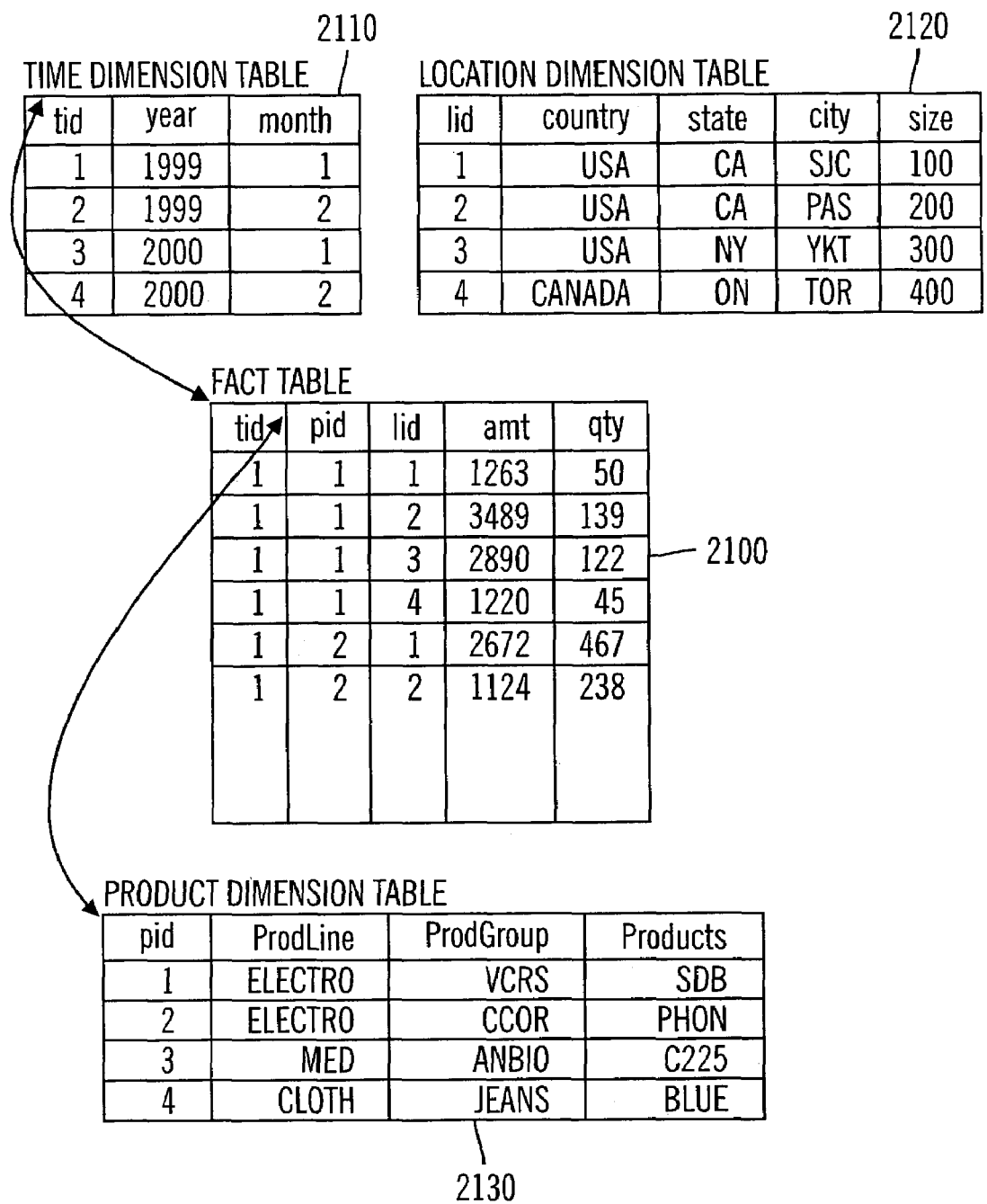
FIG. 21 illustrates a simple example of a star schema in accordance with certain implementations of the invention.

FIG. 21 illustrates a simple example of a star schema in accordance with certain implementations of the invention. The fact table 2100 has five columns. A row in the fact table 2100 contains one key value per dimension and two value columns—one for amount and one for quantity. Each of the dimension key values matches the key value in the key field of a single row of the corresponding dimension table 2110, 2120, 2130. In the highlighted row of the fact table, the key value "1" of TID matches the first row of the time dimension table 2110, so the values in this row of the fact table are for month 1 of year 1999. Similarly, key values of the PID and LID columns in the highlighted row are used to find matches in the product 2120 and location 2130 dimension tables of (ELECTRO, CCOR, SONY) and (USA, CA, SJC), respectively. The size of the store in SJC is 100, because of the dimensional attribute column in the location dimension table.

Before super aggregate operators were introduced, there were some difficulties with using the SQL language to implement large OLAP cubes. Some of the problems included: (1) GROUP BY could not be used to return the results for cells with different levels of aggregation, which meant that many different queries were required to obtain all cell values: (2) highly aggregated queries could reference virtually every row in the fact table in order to return very few cell values; (3) there was generally no memory of the results of such huge calculations—the relational engine had to start "from scratch" with each query, and as aggregates for various levels were computed, the rows of the fact table were read repeatedly; (4) SQL supported only a few aggregation functions (SUM, COUNT, AVG, MIN, and MAX); (5) the relational database catalogs did not contain metadata about the structure of star schemas, and such metadata were relegated to the domain of tools and applications, so star schemas had to be "described" multiple times—once for each application or tool used; and (6) because the metadata were not part of the database catalog, key structural information was unavailable to query compilers.

Prior to the introduction of super aggregate operations, one approach to solving the performance problems encountered in relational OLAP systems was to maintain a number of summary fact tables and associated dimension tables. In such a system, whenever data in the fact table are modified, the corresponding summary tables would be adjusted, as well. At query time, if a summary table was not available with the desired aggregations, the OLAP system had to choose an appropriate summary table containing partially aggregated results, or query the base fact table. The cost of generating the summaries is incurred once, and then can be amortized over many queries.

The OLAP multidimensional metadata system 100 uses one or more super aggregate operators of ROLLUP, CUBE, and GROUPING SETS to produce a cube view for a cube object based on other metadata objects (e.g., fact, dimension, hierarchy, measures, and cube model metadata objects).

The ROLLUP operator, an extension of the GROUP BY clause, generates multiple subtotal grouping clauses, based on a list of columns. For example, the grouping clauses may be generated using information from the hierarchy metadata object. This has the same effect, in OLAP terms, of a hierarchy calculation in a given dimension. Consider a dimension such as location, which has a hierarchy composed of country, state, and city. The ROLLUP (country, state, city) clause generates the grouping clauses that represent the calculation of the hierarchy. The general specification of a ROLLUP of n elements $(c_1, c_2, \ldots, c_{n-1}, c_n)$ is equivalent to the following grouping clauses:

$(c_1, c_2, \ldots, c_{n-1}, c_n)$
$(c_1, c_2, \ldots, c_{n-1})$
. . .
$(c_1, c_2)$
$(c_1)$ Note that n elements in a ROLLUP clause translate to (n+1) grouping clauses. An OLAP application may have multiple dimensions (e.g., defined in dimension metadata objects). A ROLLUP for each dimension returns results that represent an OLAP cube, in a relational way. The combination of more than one ROLLUP operator in a single statement results in the Cartesian product of the grouping clauses generated for each ROLLUP. For example, combining the following pair of ROLLUP operators in a single statement ROLLUP (country, state), ROLLUP (year, month) results in the generation of the following grouping clauses, which are a set of grouping clauses that make up a cube:
(country, state, year, month)
(country, state, year)
(country, state)
(country, year, month)
(country, year)
(country)
(year, month)
(year)
( )

Queries that use ROLLUP operators include all the generated grouping clauses in a single result set. Hence, the result set includes the union of all grouping clause columns, plus the aggregated columns. In order to combine results of different grouping sets, nulls are returned in any grouping columns in which a given row is not a member, as illustrated in the following example. See Table 18 for the result of the ROLLUP query for a single dimension. A SELECT statement is generated that includes a ROLLUP operator. The SELECT statement is generated based on metadata objects 130. For example, in the SELECT statement below, the "sum" operator is generated from a measures metadata object, and joins are generated from a join metadata object.
SELECT country, state, sum (amt) AS revenue
FROM fact f, location l
WHERE f.lid=l.lid
GROUP BY ROLLUP (country, state)

TABLE 18

| Country | State | Revenue |
| --- | --- | --- |
| — | — | 235329.24 |
| CANADA | — | 35754.64 |
| CANADA | ON | 35754.64 |
| U.S.A. | — | 199574.60 |
| U.S.A. | CA | 103910.41 |
| U.S.A. | NY | 94665.19 |

In the example in Table 18, the row with the aggregate revenue for USA is designated by a null (shown as a dash) in the state column. The row with the aggregate revenue for all countries and states is designated by a null in both the country and state columns.

The CUBE operator is an extension of the GROUP BY clause that generates subtotals for all the permutations of the grouping columns plus the grand total. OLAP cubes that have one attribute per dimension benefit from the CUBE operator because a complete cube can be calculated with a single statement using a single grouping clause. For example, CUBE (time, product, location) results in the following grouping clauses:
(time, product, location)
(time, product)
(time, location)
(product, location)
(time)
(product)
(location)
( )

Because the CUBE operator generates all the permutations on the columns, the resulting number of grouping clauses for n columns is $2^n$. The column order does not matter for the CUBE operator—CUBE (time, customer) and CUBE (customer, time) yield the same result set.

The GROUPING SETS operator allows multiple grouping clauses to be specified in a single statement. This can be thought of as the union of two or more groups of rows into a single result set. It is logically equivalent to the union of multiple subselects, with the GROUP BY clause in each subselect corresponding to one grouping set. The following example makes use of two groupings in the GROUPING SETS definition. See Table 19 for the result of the GROUPING SETS query.

SELECT country, state, prodline,
SUM (amt) AS revenue
FROM fact f, location l, product p
WHERE f.lid=l.lid AND f.pid=p.pid
GROUP BY GROUPING SETS ((country, state), (prodline))

TABLE 19

| Country | State | Prodline | Revenue |
|---------|-------|----------|---------|
| CANADA | ON | — | 35754.64 |
| U.S.A. | CA | | 103910.41 |
| U.S.A. | NY | | 94665.19 |
| — | — | CLOTHING | 53912.31 |
| — | — | ELECTRONICS | 77944.12 |
| — | — | MEDICAL | 103472.81 |

In the context of OLAP systems, the GROUPING SETS operator is useful in limiting the size of summary tables (discussed below). OLAP queries typically have multiple ROLLUP clauses (e.g., one for each dimension). The number of grouping sets in a result set is the product of the number of grouping sets for each ROLLUP. The number of grouping sets for each ROLLUP is one more than the number of columns in the ROLLUP. This means that a summary table built for a five-dimensional OLAP cube in which each dimension had three levels would result in $(3+1)^5=1024$ grouping sets. The GROUPING SETS operator can be used to explicitly choose which grouping sets to use in such a summary table.

Queries running against a data warehouse can easily become computationally expensive, thereby limiting the query throughput of the data warehouse. These queries are frequently aggregations of data, and the queries performed tend to have very similar aggregations. Automatic summary tables (ASTs) provide a means to precompute and store information that is repeatedly computed and accessed. Automatic summary tables are a special type of materialized view, specialized for holding aggregates, or summaries.

An automatic summary table is a table that is defined on the basis of a query result and has data in the form of precomputed results from one or more tables that would be used in the defining query. Automatic summary tables can dramatically improve response time for complex queries that involve aggregated data over one or more dimensions or tables, or slices of commonly accessed data. Automatic summary tables provide precomputed data that a RDBMS 110 can use directly. When using simple analytics such as SUM and COUNT, the RDBMS 110 can dynamically aggregate from the precomputed data.

Summary tables contain a superset of the information that can be used to answer a number of queries with minor variations. Specific aspects of a cube model can be captured in summary tables for commonly accessed queries. Costly table joins can be computed in advance and the results can be stored in a summary table. Summary tables are usually much smaller than the base tables.

A database optimizer (e.g., the database optimizer used in the DB2® SQL compiler) that knows about the summary tables can automatically rewrite queries to target a summary table instead of the base tables. A user can continue to write queries against the base tables. The database decides when to use a summary table for a particular query and will rewrite the user's query to go against the summary tables instead.

Figure 22:
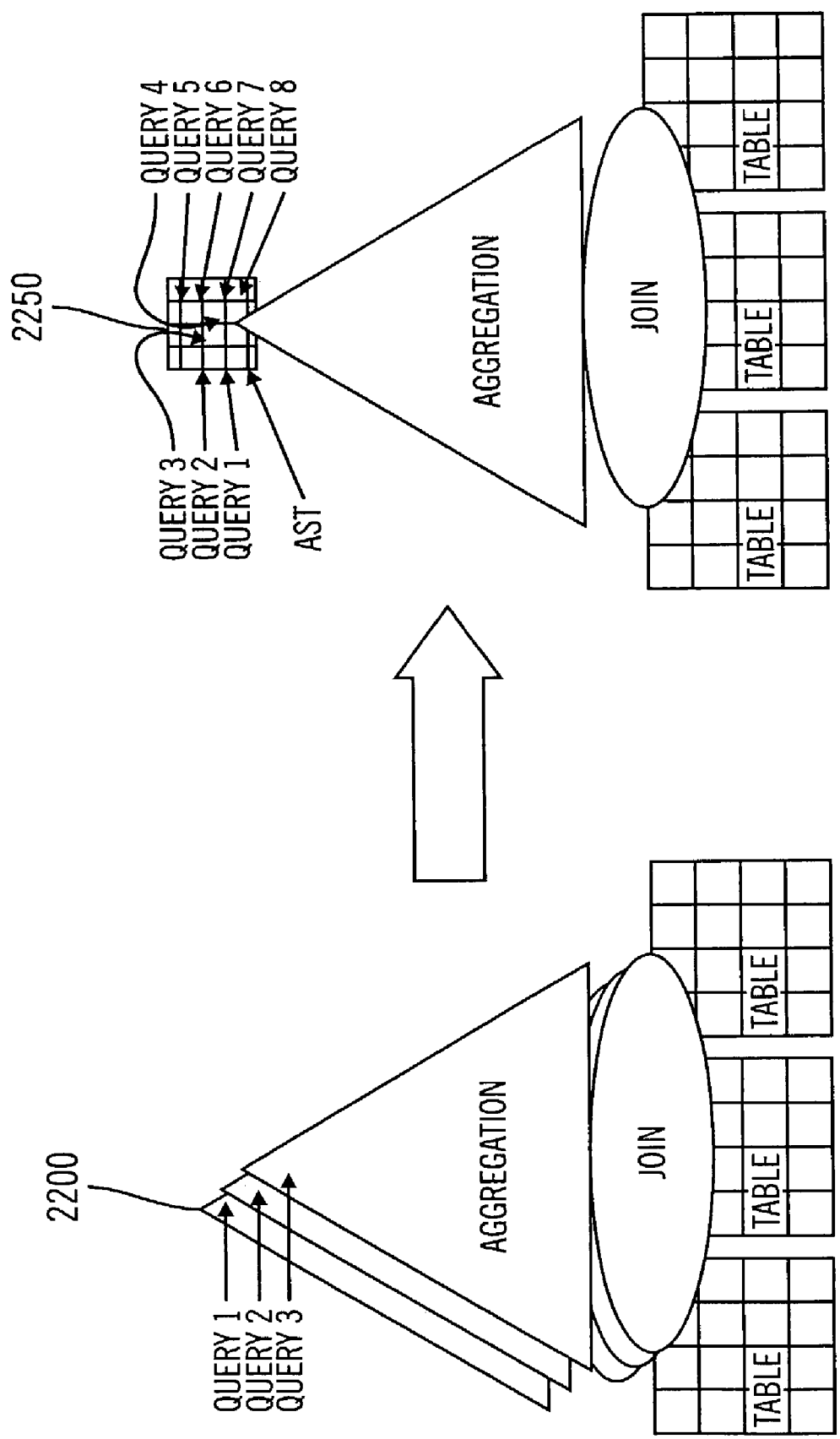
FIG. 22 illustrates an example of how automatic summary tables can reduce query time in accordance with certain implementations of the invention.

FIG. 22 illustrates an example of how automatic summary tables can reduce query time in accordance with certain implementations of the invention. On the left side 2200 of FIG. 22, similar queries have to go through all of the steps involved in joining fact and dimension tables and computing aggregates. On the right side 2250, the automatic summary table stores the common work done for a large number of queries, thereby reducing the computation needed for subsequent queries. When automatic summary tables are used in an RDBMS 110 (e.g., a DB2® UDB RDBMS), the RDBMS 110 is able to automatically reroute queries that can make use of an existing automatic summary table. This allows any application to exploit the advantages of automatic summary tables without having to change how queries are written to the database.

Additionally, the RDBMS 110 provides alternate currency models for automatic summary table maintenance. There are two basic modes: (1) refresh immediate and (2) refresh deferred. For refresh immediate, the RDBMS 110 watches for changes in any of the tables that affect values maintained in an automatic summary table. If an insert, update, or delete occurs in a table that is a source table for the automatic summary table, the RDBMS 110 includes the appropriate changes to the automatic summary table as part of the originating transaction. In this mode, the RDBMS 110 is responsible for keeping the automatic summary table consistent. For refresh deferred, changes to source tables do not trigger the RDBMS's 110 automatic summary table maintenance. This gives the database administrator (DBA) full control of when the automatic summary table maintenance should be performed, and makes the DBA responsible for determining automatic summary table currency.

OLAP applications usually require many different aggregates to be computed when a user is manipulating a specific OLAP cube. The RDBMS 110 provides special support for automatic summary tables to handle OLAP cubes. Automatic summary tables can utilize statements that include the GROUP BY extensions. These extensions, such as ROLLUP, offer the database administrator a way to define an OLAP cube inside the RDBMS 110. When an OLAP application queries the multidimensional schema, the RDBMS 110 reroutes the query to the automatic summary table that has the result already calculated. This allows the RDBMS 110 to significantly improve the query response time. Another capability of the automatic summary table support allows the RDBMS 110 to compute nonexisting aggregates by using more general computed aggregates. For example, if the RDBMS 110 has an aggregate for sales by month, and the query requests sales by quarter, the database optimizer of RDBMS 110 is able to calculate quarter FIGS. by reading the month aggregate. This saves processing time, because the number of rows that are read is smaller. Normally, an OLAP cube includes multiple dimensions, with one hierarchy per dimension. The following example shows how a simple cube with three dimensions can be defined using an automatic summary table.

```
CREATE SUMMARY TABLE CUBE AS (
SELECT l.country, l.state, l.city, p.prodline, p.prodgroup,
    p.product, t.year, t.month,
SUM (f.amt) AS revenue,
COUNT (*) AS count
FROM fact f, location l, product p, time t
WHERE f.lid=l.lid AND f.pid=p.pid AND f.tid=t.tid
GROUP BY ROLLUP (l.country, l.state, l.city),
ROLLUP (p.prodline, p.prodgroup, p.product),
ROLLUP (t.year, t.month)
) AS DATA INITIALLY DEFERRED
REFRESH IMMEDIATE
```

In this example, the automatic summary table includes 48 grouping clauses, due to the combination of the three ROLLUP clauses. Automatic summary tables that define complete cubes tend to have a large number of grouping clauses. This usually results in large automatic summary tables, which increases automatic summary table maintenance costs. However, the DBA can create automatic summary tables by utilizing the GROUPING SETS operator. In this case, a smaller number of slices of a cube are defined in the automatic summary table, making the automatic summary table simpler and smaller. This reduces the maintenance cost for the automatic summary table, but defers some costs to query time. This takes into account OLAP systems—balancing up-front calculation time and storage expenses vs the performance of queries. Finding the optimal balance usually requires an understanding of the query patterns of users of a given system.

OLAP applications usually require more complex calculations than those provided by basic aggregation functions, such as SUM and AVG. Recent extensions include ranking functions, statistical functions, and sliding window operators. The ranking functions introduced by the DB2® RDBMS compute the ordinal rank of a row with respect to a specific ordering expression. If RANK is specified, the rank of a row is defined as 1 plus the number of rows that strictly precede the row. Thus, if two or more rows are not distinct with respect to the ordering, then there will be one or more gaps in the sequential rank numbering. If DENSE_RANK is specified, the rank of a row is defined as 1 plus the number of preceding rows that are distinct with respect to the ordering. This eliminates the gaps in the sequential rank numbering. The following example shows how to use RANK to rank states and provinces by sales revenue. See Table 20 for the result.

```
SELECT country, state, prodline, SUM (amt) AS revenue,
RANK ( ) OVER
(ORDER BY SUM (amt) desc) AS rank
FROM fact f, location l, product p
WHERE f.lid=l.lid AND f.pid=p.pid
GROUP BY country, state
```

TABLE 20

| Country | State | Revenue | Rank |
|---------|-------|---------|------|
| CANADA  | ON    | 35754.64 | 3    |
| U.S.A.  | CA    | 103910.41 | 1    |
| U.S.A.  | NY    | 94665.19 | 2    |

Statistical functions, which include correlation, variance, covariance, standard deviation, and a family of linear regression functions, improve the support to complex OLAP applications.

Sliding window operators give the ability to analyze data with respect to a window that is dynamically determined. The window, a set of rows, is determined according to the operation requested, for example, "ROWS BETWEEN 3 PRECEDING AND 3 FOLLOWING." Given such a window, the aggregation function is applied. Sliding window operators are useful in applications designed to calculate, for instance, the seven day centered average of a stock for each day that it was traded.

Figure 23:
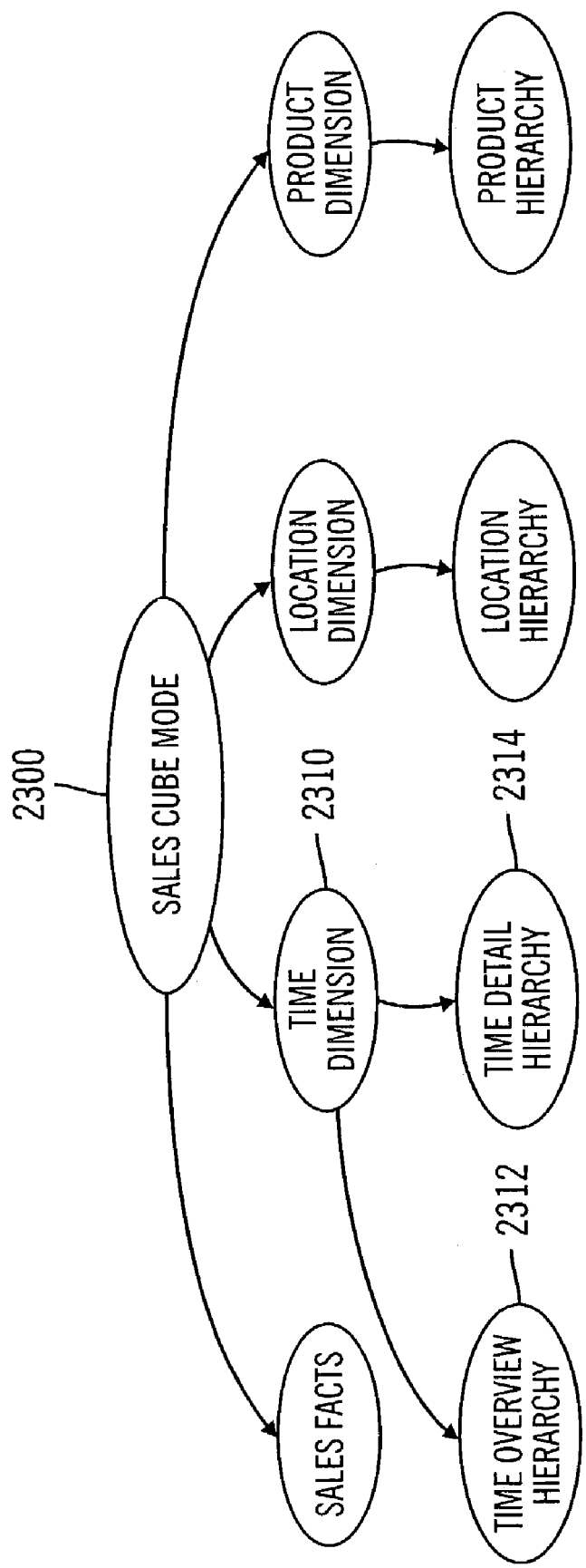
FIG. 23 illustrates a cube model created based on a star schema in accordance with certain implementations of the invention.

FIG. 23 illustrates a cube model created based on the star schema of FIG. 21 in accordance with certain implementations of the invention. For the cube model metadata object 2300, the time dimension metadata object 2310 references two different hierarchy metadata objects 2312, 2314.

Figure 24:
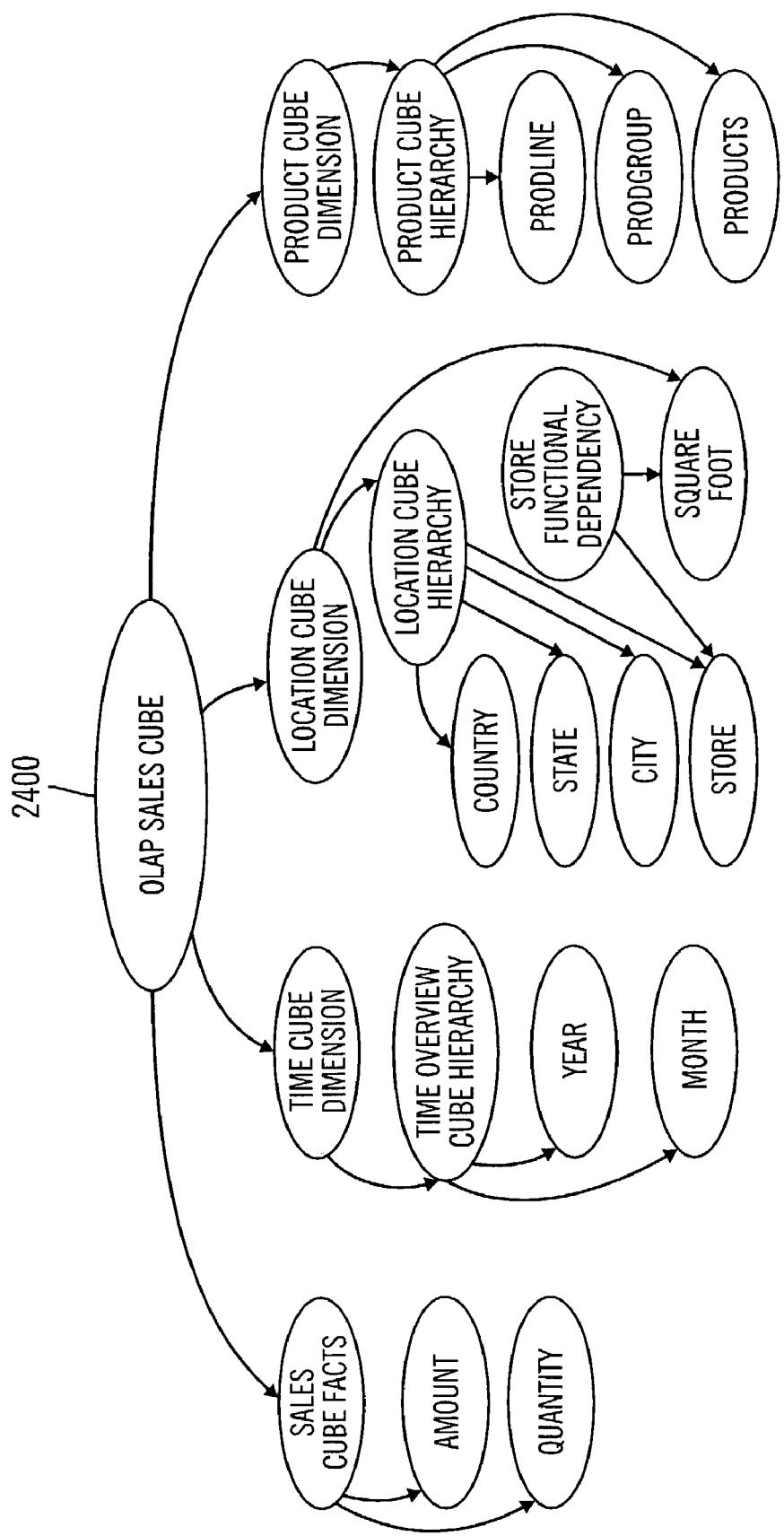
FIG. 24 illustrates metadata objects and relationships among those objects in accordance with certain implementations of the invention.

FIG. 24 illustrates metadata objects created for the example of FIG. 19 and the relationships among those objects in accordance with certain implementations of the invention. Using the metadata schema, a cube view may be created as part of the definition of a cube metadata object 2400 named Sales. The data values for all of the cells in the example cube metadata object 2400 may be calculated with the following: SELECT*FROM sales. To do so, in the SELECT clause of the cube view, the fact and the dimension tables are joined and ROLLUP operators are used to compute subtotals and totals of revenue and volume.

FIG. 25 illustrates a Sales cube 2500, which is an annotated result set illustrating the terminology used to describe the example cube shown in FIG. 19 in accordance with certain implementations of the invention. In FIG. 25, ellipses represent rows that are not illustrated. The sales cube 2500 includes product dimension levels 2510, location dimension levels 2520, member attributes 2530, and time dimension levels 2540. The ordering of the dimension levels may be modified without departing from the scope of the invention. In practice, querying all of the cells of a cube would be unusual, as most real cubes are too large for such a query to be practical. Instead, the sales cube 2500 defined here would be queried using predicates to limit the data retrieved to the subset of interest for a report or analytical exercise. The following is an example query for generating a cube view:

```
CREATE VIEW sales AS (SELECT
p.prodline, p.prodgroup, p.products,
l.country, l.state, l.city,
l.locid AS store, l.size AS square_foot,
t.year, t.month,
SUM (f.amt) AS amount,
SUM (f.qty) as quantity
FROM fact f,
time t,
product p,
location l
WHERE f.tid=t.tid AND
f.pid=p.pid AND
f.lid=l.lid AND
GROUP BY
ROLLUP (p.prodline, p.prodgroup, p.products),
ROLLUP (l.country, l.state, l.city, (l.locid, l.size)),
ROLLUP (t.year, t.month));
```

The introduction of the cube object provides a model that shifts the access paradigm of relational OLAP. Applications now can, in a single SQL query, retrieve multidimensional data at varying levels of aggregation, without any need to include code to manage summary tables and aggregation currency. Thus, a relational database is able to assume responsibility for storage and calculation management activities that, until now, have been handled by relational OLAP products and applications.

B.2 Details of Use of Cube Views and Extended Describe

Given metadata for a schema (e.g., star or snowflake) that describes all cubes (e.g., a cube model for which all fact and dimension tables, and their connections via joins, and all hierarchies, etc. are defined) and metadata that describes the roles of the columns in tables used to form the cubes, a subset of the metadata may be selected to construct a relational view (i.e., a particular cube). The cube may then be queried, and the result of the query is a multidimensional result set.

Figure 26:
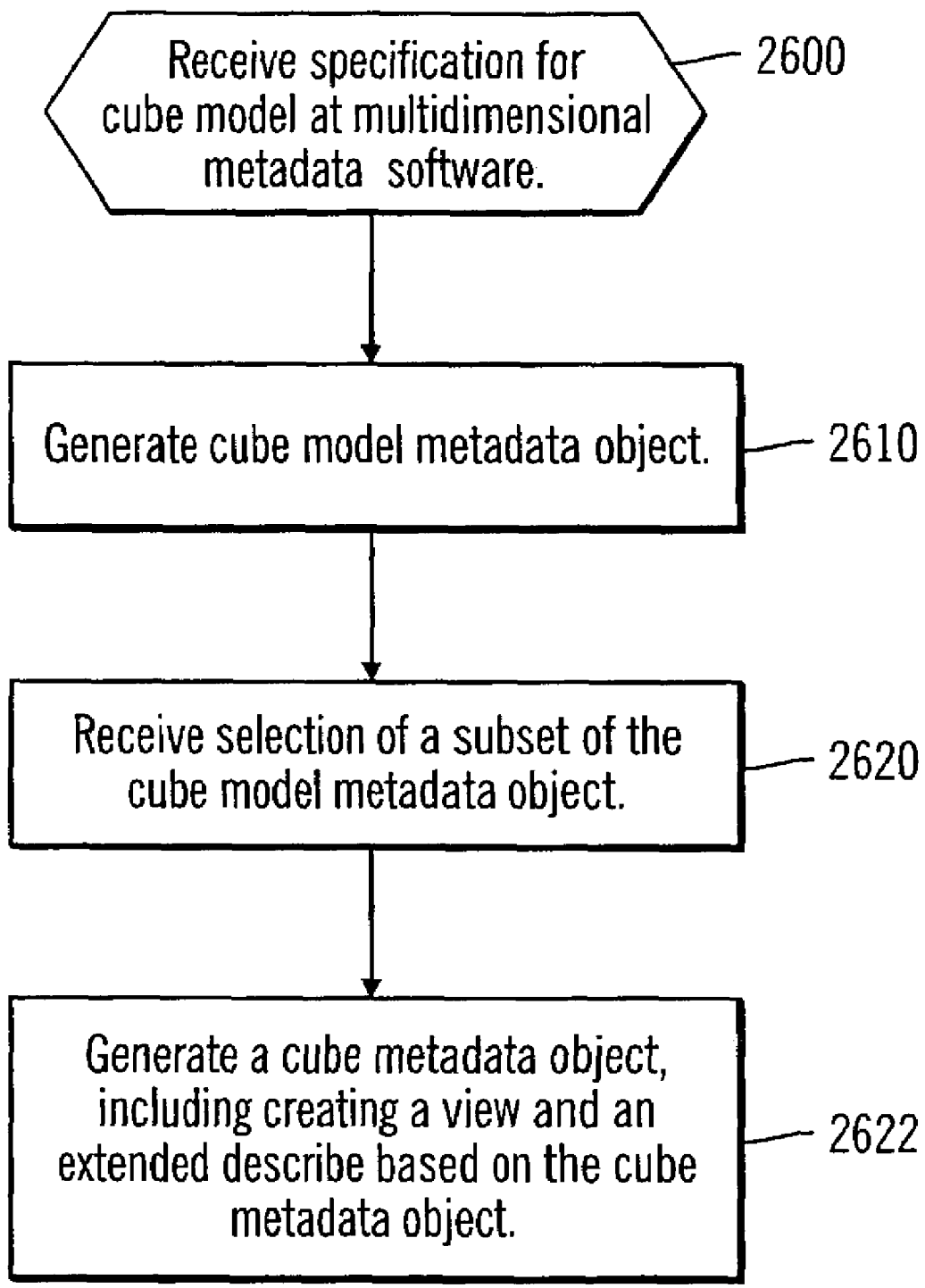
FIG. 26 illustrates logic implemented to generate a cube view in accordance with certain implementations of the invention.

FIG. 26 illustrates logic implemented to generate a cube view in accordance with certain implementations of the invention. Control begins at block 2600 with the multidimensional metadata software 120 receiving a specification for a cube model metadata object. In certain implementations, the specification may be received in the form of an XML document. In certain implementations, the specification may be received via the user interface 150. The specification provides the multidimensional metadata software 120 with information to generate metadata objects (e.g., fact and dimension metadata objects).

In block 2610, the multidimensional metadata software 120 generates a cube model metadata object based on the specification. In block 2620, the multidimensional metadata software 120 receives selection of a subset of the cube model metadata object. In certain implementations, a selection of facts and dimensions in the cube model metadata object is received. In certain implementations, the selection may be received in the form of an XML document. In certain implementations, the selection may be received via the user interface 150. In certain implementations, any time after one or more cube model metadata objects are generated, one or more selections of subsets of the cube model metadata object may be received.

In block 2622, the multidimensional metadata software 120 generates a cube metadata object based on the selection of the subset of the cube model metadata object. The cube metadata object includes a cube view and an extended describe that are based on the cube metadata object. A cube view may be queried with, for example, a SQL statement. The extended describe provides information about the columns in the cube view, such as their relationship to each other.

In particular, in block 2622, the multidimensional metadata software automatically generates SQL for generating the cube view. For simple cube metadata objects with fully symmetric calculations, the cube view is created using simple aggregate functions of the measure columns and a ROLLUP operator for each dimension. Fact and dimension tables are joined using joins. More complex queries can be used to create cube views with this "shape." The present invention is intended to cover any cube view that has the specified shape, regardless of the complexity of the SELECT statement required to describe the results. The cube view could even be a very simple SELECT statement referencing a table (real or wrapped) that is maintained by means that cannot be described with a SELECT statement. The following is an example SELECT query utilizing the ROLLUP operator to generate a cube view:

SELECT country, state, sum (amt) AS revenue
FROM fact f, location l
WHERE f.lid=l.lid
GROUP BY ROLLUP (country, state)

Once a cube view is generated, a query may be received for the cube view by the RDBMS 110. The RDBMS 110 processes the query and returns a multidimensional result set.

FIG. 27 illustrates a sample format of a cube view in accordance with certain implementations of the invention. In certain implementations, the columns of the cube view are ordered with the measures 2610 listed first, then each dimension 2620, 2630 with the dimension attributes listed by levels. The particular order of the columns may be modified without departing from the scope of the invention. The columns are described in a manner that an application can determine the correct role of any column. For simplicity, the columns of the cube view are ordered in the same order that they appear in an associated extended describe. The application is able to query the extended describe to obtain the ordering information in order to better understand the cube view.

Figure 28:
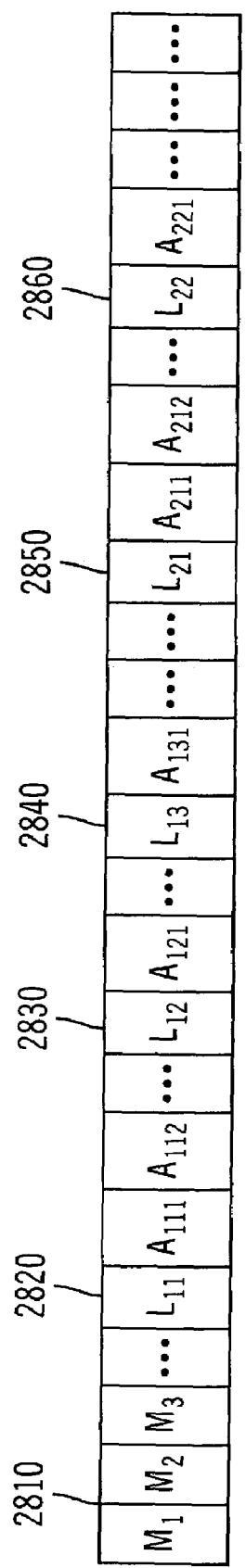
FIG. 28 illustrates further details of a sample format of a cube view in accordance with certain implementations of the invention.

FIG. 28 illustrates further details of a sample format of a cube view 2800 in accordance with certain implementations of the invention. The columns of a cube view 2800 describe a multidimensional row set. Measures 2810 are listed before dimensions. Attributes for dimension n appear as the complete hierarchy of level attributes and associated attributes for that dimension. For example, level attribute $L_{11}$ 2820 represents level one of dimension one (e.g., 2720), level attribute $L_{12}$ 2830 represents level two of dimension one, and level attribute $L_{13}$ 2840 represents level three of dimension one. Level attribute $L_{21}$ 2850 represents level one of dimension two (e.g., 2730), and level attribute $L_{22}$ 2860 represents level two of dimension two. Each of the level attributes 2820, 2830, 2840, 2850, and 2860 have associated attributes. For example, attributes $A_{111}$ and $A_{112}$ are attributes of the first level 2820 of dimension one.

The cube view represents and describes how to compute all cells of a cube metadata object. A cube view can be queried with a SELECT statement, which returns a multidimensional result set in which the array of returned measures are described by the sets of values in the level attributes and associated attributes for each of the several dimensions of the cube. The cube view does not require the materialization of any of the calculated cells of the cube. This leaves a great deal of flexibility (e.g., opportunities for optimization) in the way that cells are computed at query time. This also means that the cost of computing cell values are shared by the set of all queries of the cube view.

The level attributes of the multidimensional result set are partitioned among the measures and dimensions of the cube. For each dimension, the level attributes comprising the hierarchy for the dimension are identified, and the parent-child relationships among them are specified. The attribute columns in a given dimension may also be associated with one of the level attributes from the hierarchy for that dimension.

An application querying a cube view can ask the RDBMS 110 for a description of the attribute columns of the multidimensional result set. In prior art systems, this description generally gives the names of the columns, the data type, and the length of the data in the columns, but this is not enough information to understand the results of querying a cube view in multidimensional terms. Thus, implementations of the invention provide a description of the roles of the columns in the multidimensional result set and their relationships. This description is metadata and is provided in the extended describe.

An example of an XML document describing a cube view appears below under the heading "Sample Extended Describe." In certain implementations, the name and measure or attribute references are generally the same in the extended describe and the cube view. They may be different in some cases due to differences in the name spaces for column and attribute names. This technique for enumerating the columns of the cube view is preferred for certain implementations. Many other mechanisms for enumerating the columns may be used without departing from the scope of the invention.

```
                Sample Extended Describe

<cubeView name="SalesCubeView" schema="Sales" cubeName=
"SalesCube"
cubeSchema="Sales">
    <column name="SALESDOLLARS" role="measure"
        <measureRef name="SalesDollars" schema="Sales"/>
    </column>
    <column name="SALESCOST" role="measure"
        <measureRef name="SalesCost" schema="Sales"/>
    </column>
    <column name="REGION" role="level"
        <attributeRef name="Region" schema="Sales"/>
        <cubeDimensionRef name="Market" schema="Sales"/>
    </column>
    <column name="STATE" role="level"
        <attributeRef name="State" schema="Sales"/>
        <cubeDimensionRef name="Market" schema="Sales"/>
    </column>
    <column name="STATEPOP" role="associated"
        <attributeRef name="StatePop" schema="Sales"/>
        <cubeDimensionRef name="Market" schema="Sales"/>
        <levelColumnRef name="STATE"/>
    </column>
    <column name="CITY" role="level"
        <attributeRef name="City" schema="Sales"/>
        <cubeDimensionRef name="Market" schema="Sales"/>
    </column>
    <column name="FAMILY" role="level"
        <attributeRef name="Family" schema="Sales"/>
        <cubeDimensionRef name="Product" schema="Sales"/>
    </column>
    <column name="SKU" role="level"
        <attributeRef name="SKU" schema="Sales"/>
        <cubeDimensionRef name="Product" schema="Sales"/>
    </column>
    <column name="PKGTYPE" role="associated"
        <attributeRef name="PkgType" schema="Sales"/>
        <cubeDimensionRef name="Product" schema="Sales"/>
        <levelColumnRef name="SKU"/>
    </column>
</cubeView>
```

The Sample Extended Describe provides information about the level with which an attribute is associated. For example, the STATEPOP column (i.e., <column name="STATEPOP" role="associated") is associated with the STATE level (i.e., <levelColumnRef name="STATE"/>) with the following text in the Sample Extended Describe:

```
<column name="STATEPOP" role="associated"
    <attributeRef name="StatePop" schema="Sales"/>
    <cubeDimensionRef name="Market" schema="Sales"/>
    <levelColumnRef name="STATE"/>
</column>
```

An XML Path Language (XPATH) query (which is defined in XML Path Language (XPATH), Version 1.0, W3C Recommendation 16 Nov. 1999 and is available at http://www.w3.org/TR/xpath), can be used to locate the description for a particular column by number, if desired. The results of the XPATH queries are based on the extended describe. For example, the results of XPATH query (1) and (2) below are based on the above sample extended describe.

For example, to get the description for the fourth column in the cube view, the following XPATH query (1) may be submitted:

XPATH query: /cubeView/column[4]    (1)

For example, the result of the XPATH query (1) is:

```
<column name="STATE" role="level"
    <attributeRef name="State" schema="Sales"/>
    <cubeDimensionRef name="Market" schema="Sales" />
</column>
```

As another example, to get the description of the column named SALESCOST in the cube view, the following XPATH query (2) may be submitted:

XPATH query: /CubeView/column
    [name="SALESCOST"]    (2)

The result of the XPATH query (2) is:

```
<column name="SALESCOST" role="measure"
    <measureRef name="SalesCost" schema="Sales"/>
</column>
```

In certain implementations, a cube metadata object is provided for each instance of a cube. The cube metadata object includes a reference to the cube view and a description of the roles of the columns in the cube view. In certain implementations, the extended describe is an XML document comprising column nodes. In certain implementations, column nodes are defined in the XML document in the same order that they are defined in the cube view, as this avoids having to include positional information in the column descriptions. In certain implementations, the results columns in the cube view and in the extended description are ordered such that all measures come first, followed by all of the columns for the first dimension, followed by all of the columns for the second dimension, etc. Within each dimension, the columns are ordered such that the column for the highest level in the hierarchy appears first, followed by any attribute columns for that level. These columns are followed by the level attribute for the second level of the hierarchy, followed by the attribute columns for that level. This pattern continues until the lowest level attribute and any attribute columns for the lowest level of the hierarchy are enumerated. Moreover, although the cube view is created with a particular order, a user may query the cube view in any order.

For the cube illustrated in FIG. 19, a cube view (i.e., result set) might include two columns for time, three columns for product, five columns for location (i.e., including a square foot attribute that is an attribute of the store level), one column for amount, and one column for quantity. Thus, the cube view has eleven columns. Without information on the ordering of the columns and which columns are associated with which dimensions and measures, the cube view is not useful. The OLAP multidimensional metadata system 100 provides the information on the ordering and the roles of the columns (e.g., whether the column is for a dimension or measure) in an XML document, which is referred to as an extended describe. The multidimensional result set is then ordered in the order specified in the XML document, with all columns of a dimension ordered next to each other and from highest to lowest level. For example, for the time dimension, the year and month columns are represented in the multidimensional result set, along with any attributes for the columns (e.g., a season attribute for the month column).

Once a cube view is created, a user or application may request a list of cube metadata objects, select a cube metadata object from the list, and request information from the extended describe for the selected cube metadata object.

DB2, Z/OS, and AIX are trademarks of International Business Machines Corporation. WINDOWS is a trademark of Microsoft Corporation. SOLARIS is a trademark of Sun Microsystems. LINUX is a trademark of Linus Torvalds. HP-UX is an Open Group UNIX 95 branded product. PILOT is a trademark of Pilot Software. EXPRESS is a trademark of Oracle Corporation. ESSBASE is a trademark of Hyperion Solutions Corporation. TM1 is a trademark of Applix, Inc.

ADDITIONAL IMPLEMENTATION DETAILS

The described techniques for maintaining information on network components may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission medium or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

There are many ways that the roles may be described. For example, the roles may be described with metadata in a file, rather than in an XML document.

The logic of FIG. 26 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel, or operations described as performed by a single process may be performed by distributed processes.

The logic of FIG. 26 was described as being implemented in software. This logic may be part of the operating system of the host systems or an application program. In yet further implementations, this logic may be maintained in storage areas or in a read only memory or other hardwired type of device. The preferred logic may be implemented in hard disk drives or in programmable and non-programmable gate array logic.

Figure 29:
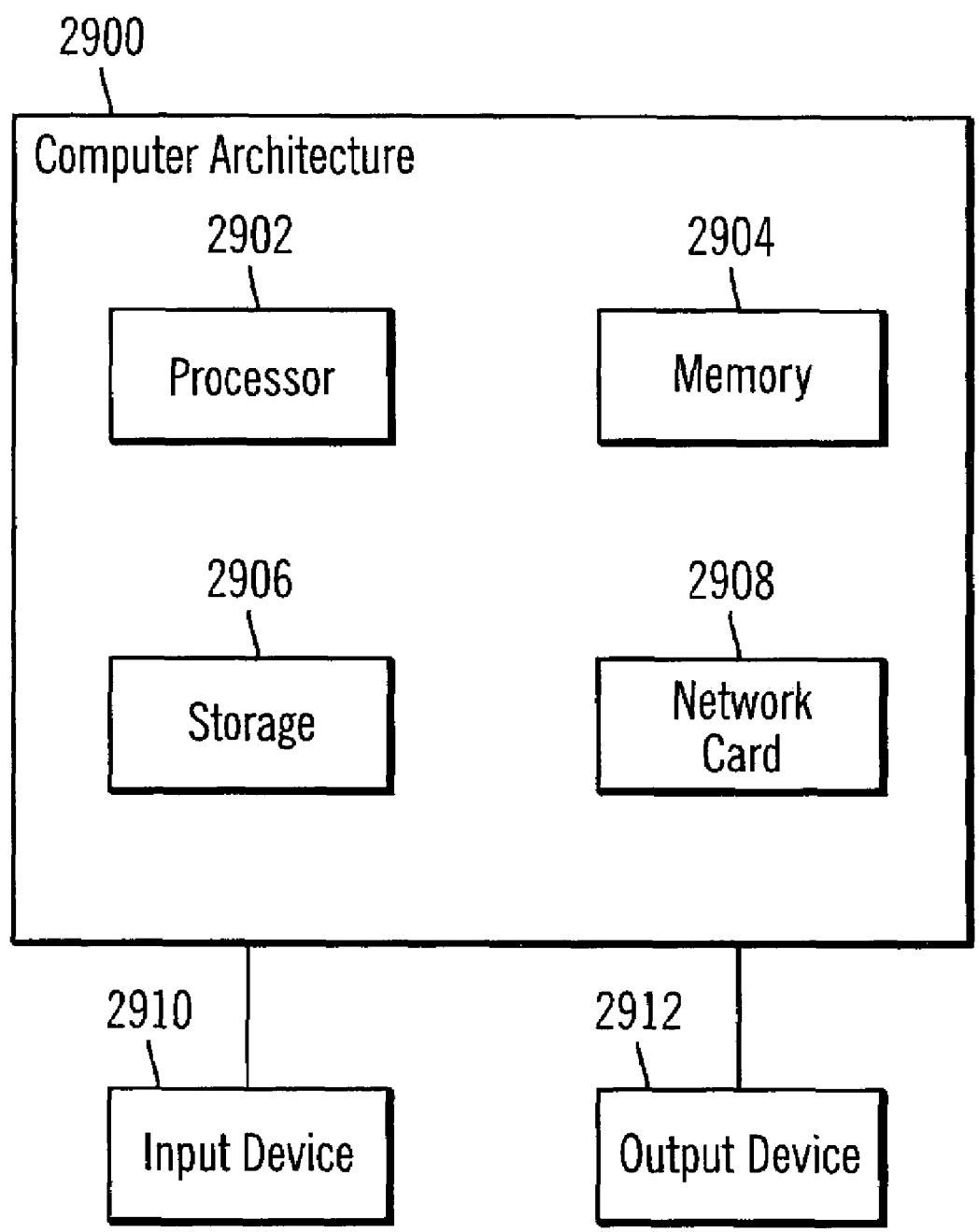
FIG. 29 illustrates one implementation of the architecture of the computer system in accordance with certain implementations of the invention.

FIG. 29 illustrates one implementation of the architecture of the computer system 100 in accordance with certain implementations of the invention. The computer system 100 may implement a computer architecture 2900 having a processor 2902 (e.g., a microprocessor), a memory 2904 (e.g., a volatile memory device), and storage 2906 (e.g., a non-volatile storage area, such as magnetic disk drives, optical disk drives, a tape drive, etc.). The storage 2906 may comprise an internal storage device or an attached or network accessible storage. Programs in the storage 2906 are loaded into the memory 2904 and executed by the processor 2902 in a manner known in the art. The architecture further includes a network card 2908 to enable communication with a network. An input device 2910 is used to provide user input to the processor 2902, and may include a keyboard, mouse, pen-stylus, microphone, touch sensitive display screen, or any other activation or input mechanism known in the art. An output device 2912 is capable of rendering information transmitted from the processor 2902, or other component, such as a display monitor, printer, storage, etc.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for query processing, comprising:
    storing metadata for a facts metadata object and one or more dimension metadata objects that are associated with the facts metadata object, wherein the metadata is multidimensional metadata, wherein the facts metadata object includes information about measures, attributes, and related joins, and wherein each of the one or more dimension metadata objects includes one or more of information about hierarchies, attributes, attribute relationships, and related joins;
    constructing a view with columns for one or more measures in the facts metadata object and one or more attributes in the one or more dimension metadata objects; and
    generating additional metadata that describes roles of columns in the facts metadata object and the one or more dimension metadata objects and relationships of the columns.

2. The method of claim 1, further comprising:
    receiving a specification describing the facts metadata object, the one or more dimension metadata objects, and a join metadata object that describes how one or more tables in the facts metadata object and one or more tables in the one or more dimension metadata objects are joined; and
    creating the metadata from the specification.

3. The method of claim 1, wherein the metadata comprises metadata objects.

4. The method of claim 1, further comprising:
generating a cube model metadata object from the specification.

5. The method of claim 1, further comprising:
generating a cube metadata object that includes the view and the additional metadata from the cube model metadata object.

6. The method of claim 1, wherein the view may be queried.

7. The method of claim 1, wherein the additional metadata may be queried.

8. The method of claim 1, wherein the metadata is stored in a database catalog.

9. The method of claim 1, further comprising:
generating a structured query language statement to construct the view.

10. The method of claim 1, wherein the view is constructed using aggregate functions of the measures and a ROLLUP operator for each dimension specified in the one or more dimension metadata objects.

11. The method of claim 1, wherein the additional metadata is stored in an extensible markup language document.

12. The method of claim 1, wherein the columns in the view are ordered in accordance with the ordering of columns in the additional metadata.

13. A computer-readable medium for storing data for access by a program, comprising:
a data structure stored in the computer-readable medium, wherein the data structure includes data for use by the program and comprising:
a cube model metadata object that includes a facts metadata object, one or more dimension metadata objects, and one or more join metadata objects that describe how one or more tables in the facts metadata object and one or more tables in the one or more dimension metadata objects are joined; and
a cube metadata object that represents a subset of the cube model metadata object and comprises a view with columns for one or more measures of one of the facts metadata objects and one or more attributes of one or more of the dimension metadata objects and a document that describes roles of columns in the facts metadata object and the one or more dimension metadata objects.

14. The computer-readable medium of claim 13, wherein the facts metadata object comprises a set of measure metadata objects, a set of dimension metadata objects, and a set of join metadata objects.

15. The computer-readable medium of claim 13, wherein each of the dimension metadata objects comprises a set of attribute metadata objects, a set of hierarchy metadata objects, a set of join metadata objects, and a type.

16. The computer-readable medium of claim 13, wherein each of the metadata objects has a set of common properties.

17. The computer-readable medium of claim 13, wherein the data structure further includes:
at least one cube facts metadata object;
at least one cube dimension metadata object; and
at least one cube hierarchy metadata object.

18. The computer-readable medium of claim 13, wherein the cube metadata object specifies the cube model metadata object.

19. A system for query processing, comprising:
a computer system having at least one program for:
(i) storing metadata for a facts metadata object and one or more dimension metadata objects that are associated with the facts metadata object, wherein the metadata is multidimensional metadata, wherein the facts metadata object includes information about measures, attributes, and related joins, and wherein each of the one or more dimension metadata objects includes one or more of information about hierarchies, attributes, attribute relationships, and related joins;
(ii) constructing a view with columns for one or more measures in the facts metadata object and one or more attributes in the one or more dimension metadata objects; and
(iii) generating additional metadata that describes roles of columns in the fact and dimension metadata objects and relationships of the columns.

20. The system of claim 19, wherein the at least one program further comprises:
receiving a specification describing the facts metadata object, the one or more dimension metadata objects, and a join metadata object that describes how one or more tables in the facts metadata object and one or more tables in the one or more dimension metadata objects are joined; and
creating the metadata from the specification.

21. The system of claim 19, wherein the at least one program further comprises:
generating a structured query language statement to construct the view.

22. The system of claim 19, wherein the view is constructed using aggregate functions of the measures and a ROLLUP operator for each dimension specified in the one or more dimension metadata objects.

23. The system of claim 19, wherein the additional metadata is stored in an extensible markup language document.

24. The system of claim 19, wherein the columns in the view are ordered in accordance with the ordering of columns in the additional metadata.

25. An article of manufacture including a program for query processing, wherein the program causes operations to be performed, the operations comprising:
storing metadata for a facts metadata object and one or more dimension metadata objects that are associated with the facts metadata object, wherein the metadata is multidimensional metadata, wherein the facts metadata object includes information about measures, attributes, and related joins, and wherein each of the one or more dimension metadata objects includes one or more of information about hierarchies, attributes, attribute relationships, and related joins;
constructing a view with columns for one or more measures in the facts metadata object and one or more attributes in the one or more dimension metadata objects; and
generating additional metadata that describes roles of columns in the facts metadata object and dimension metadata objects and relationships of the columns.

26. The article of manufacture of claim 25, the operations further comprising:
receiving a specification describing the facts metadata object, the one or more dimension metadata objects, and a join metadata object that describes how one or more tables in the facts metadata object and one or more tables in the one or more dimension metadata objects are joined; and
creating the metadata from the specification.

27. The article of manufacture of claim 25, the operations further comprising:

generating a structured query language statement to construct the view.

28. The article of manufacture of claim 25, wherein the view is constructed using aggregate functions of the measures and a ROLLUP operator for each dimension specified in the one or more dimension metadata objects.

29. The article of manufacture of claim 25, wherein the additional metadata is stored in an extensible markup language document.

30. The article of manufacture of claim 25, wherein the columns in the view are ordered in accordance with the ordering of columns in the additional metadata.

* * * * *